US012782643B2

(12) United States Patent
Sutherland

(10) Patent No.: US 12,782,643 B2
(45) Date of Patent: Nov. 3, 2026

(54) SYSTEMS AND METHODS OF JOINING SUBSTRATES USING NANO-PARTICLES

(71) Applicant: CORNING RESEARCH & DEVELOPMENT CORPORATION, Corning, NY (US)

(72) Inventor: James Scott Sutherland, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 138 days.

(21) Appl. No.: 18/514,016

(22) Filed: Nov. 20, 2023

(65) Prior Publication Data

US 2024/0085635 A1 Mar. 14, 2024

Related U.S. Application Data

(63) Continuation of application No. PCT/US2022/029111, filed on May 13, 2022.

(Continued)

(51) Int. Cl.

*B23K 1/00* (2006.01)
*B23K 1/008* (2006.01)

(Continued)

(52) U.S. Cl.

CPC .......... *G02B 6/3684* (2013.01); *B23K 1/0016* (2013.01); *B23K 1/008* (2013.01);

(Continued)

(58) Field of Classification Search

CPC ................ G02B 6/3684; G02B 6/3636; G02B 6/12004; G02B 6/3628; G02B 6/4267;

(Continued)

(56) References Cited

U.S. PATENT DOCUMENTS

| | | | |
|---|---|---|---|
| 6,512,642 | B1 | 1/2003 | Bourcier et al. |
| 7,210,519 | B2 | 5/2007 | Chen |

(Continued)

FOREIGN PATENT DOCUMENTS

| | | | |
|---|---|---|---|
| CN | 1629593 | A | 6/2005 |
| CN | 1710715 | A | 12/2005 |

(Continued)

OTHER PUBLICATIONS

Yanqing, Z., Ren-li, F., Liu, X., Liu, H., & Wang, H. "Enhanced adhesion strength of silver paste on AIN ceramic substrate via sintered nano-CuO". Ceramics International., vol. 47, 2021, pp. 9471-9476.

(Continued)

*Primary Examiner* — Kiley S Stoner
(74) *Attorney, Agent, or Firm* — Tamika A. Crawl-Bey

(57) ABSTRACT

Methods and systems for joining photonic components. A method includes suspending nano-particles in a medium, wherein the nano-particles include metal nano-particles. The method further includes applying a layer of the nano-particle medium to a first substrate, and exposing the layer of nano-particle medium to a thermal process to remove at least a portion of the medium and expose the nano-particles. A second substrate is placed on the nano-particles in alignment with the first substrate, and a heat is applied to the nano-particles to cause connection of contact points between adjacent nano-particles to cause a secure alignment of the first and second substrates. The heat applied to the layer of nano-particles is less than 300° C.

20 Claims, 34 Drawing Sheets

Related U.S. Application Data

(60) Provisional application No. 63/192,184, filed on May 24, 2021.

(51) Int. Cl.

| | |
|---|---|
| ***B32B 3/30*** | (2006.01) |
| ***B32B 7/12*** | (2006.01) |
| ***B32B 17/06*** | (2006.01) |
| ***B32B 37/06*** | (2006.01) |
| ***C03C 27/08*** | (2006.01) |
| ***G02B 6/36*** | (2006.01) |
| *B23K 3/06* | (2006.01) |

(52) U.S. Cl.

CPC .................. *B32B 3/30* (2013.01); *B32B 7/12* (2013.01); *B32B 17/06* (2013.01); *B32B 37/06* (2013.01); *C03C 27/08* (2013.01); *G02B 6/3636* (2013.01); *B23K 3/0638* (2013.01); *B32B 2264/105* (2013.01); *B32B 2309/02* (2013.01); *B32B 2309/04* (2013.01); *B32B 2315/08* (2013.01)

(58) Field of Classification Search

CPC ........... G02B 6/4236; B32B 3/30; B32B 7/12; B32B 17/06; B32B 37/06; B32B 2264/105; B32B 2309/02; B32B 2309/04; B32B 2315/08; C03C 27/08; B23K 1/0008; B23K 1/0016; B23K 1/005; B23K 1/0053; B23K 1/0056; B23K 1/008; B23K 1/012; B23K 3/0638; B23K 35/0244–025; B23K 2103/16–172; B23K 35/3006–302

USPC .......................... 228/121-124.7, 248.1–248.5

See application file for complete search history.

(56) References Cited

U.S. PATENT DOCUMENTS

| | | | | |
|---|---|---|---|---|
| 7,480,432 | B2 | 1/2009 | Grzybowski et al. | |
| 7,724,992 | B2 | 5/2010 | Sutherland | |
| 7,948,077 | B2 | 5/2011 | Andry et al. | |
| 7,992,627 | B2 | 8/2011 | Bezama et al. | |
| 8,211,376 | B2 | 7/2012 | Caze et al. | |
| 8,291,729 | B2 | 10/2012 | Grzybowski et al. | |
| 8,397,537 | B2 | 3/2013 | Grzybowski et al. | |
| 8,987,891 | B2 | 3/2015 | Di Stefano | |
| 10,172,258 | B2 | 1/2019 | Bodenweber et al. | |
| 11,415,754 | B2 | 8/2022 | Butler et al. | |
| 11,586,000 | B2 | 2/2023 | Butler et al. | |
| 2006/0157225 | A1 | 7/2006 | Martin et al. | |
| 2007/0213429 | A1 | 9/2007 | Cheng et al. | |
| 2008/0202380 | A1 | 8/2008 | Bao et al. | |
| 2008/0236795 | A1 | 10/2008 | You et al. | |
| 2010/0093131 | A1* | 4/2010 | Maeda | B23K 3/0623 257/E21.705 |
| 2012/0025365 | A1 | 2/2012 | Haba | |
| 2012/0114927 | A1 | 5/2012 | Khaselev et al. | |
| 2014/0144609 | A1 | 5/2014 | Choi et al. | |
| 2017/0144221 | A1* | 5/2017 | Ghoshal | B23K 3/0607 |
| 2019/0177219 | A1* | 6/2019 | Karam | C03C 27/10 |
| 2020/0276645 | A1* | 9/2020 | Ichikawa | H01L 24/83 |
| 2021/0096302 | A1 | 4/2021 | Butler et al. | |
| 2021/0341678 | A1 | 11/2021 | Butler et al. | |
| 2021/0341679 | A1 | 11/2021 | Cuno et al. | |

FOREIGN PATENT DOCUMENTS

| | | | | | |
|---|---|---|---|---|---|
| CN | 101097897 | A | | 1/2008 | |
| CN | 101266110 | A | | 9/2008 | |
| CN | 100471364 | C | * | 3/2009 | G02B 6/4202 |
| CN | 101776409 | A | | 7/2010 | |
| CN | 101796365 | A | | 8/2010 | |
| CN | 201803147 | U | | 4/2011 | |
| CN | 102212304 | A | | 10/2011 | |
| CN | 203983270 | U | | 12/2014 | |
| CN | 204678937 | U | | 9/2015 | |
| CN | 105290418 | A | | 2/2016 | |
| CN | 105772118 | A | | 7/2016 | |
| CN | 105873248 | A | | 8/2016 | |
| CN | 106449552 | A | | 2/2017 | |
| CN | 106834777 | A | | 6/2017 | |
| CN | 107663438 | A | | 2/2018 | |
| CN | 107887368 | A | | 4/2018 | |
| CN | 108231242 | A | | 6/2018 | |
| CN | 108778695 | A | * | 11/2018 | B32B 37/065 |
| CN | 109483780 | A | | 3/2019 | |
| CN | 208606625 | U | | 3/2019 | |
| CN | 109701674 | A | | 5/2019 | |
| CN | 109979905 | A | | 7/2019 | |
| CN | 110246816 | A | | 9/2019 | |
| CN | 110749222 | A | | 2/2020 | |
| CN | 112665890 | A | | 4/2021 | |
| CN | 112719263 | A | | 4/2021 | |
| CN | 112756841 | A | * | 5/2021 | B23K 35/3006 |
| CN | 113023666 | A | | 6/2021 | |
| JP | 2007-250540 | A | | 9/2007 | |
| JP | 5021919 | B2 | | 9/2012 | |
| JP | 2020-067269 | A | | 4/2020 | |
| KR | 10-1447129 | B1 | | 10/2014 | |
| KR | 10-1597651 | B1 | | 2/2016 | |
| KR | 10-1618211 | B1 | | 5/2016 | |
| WO | 2008/042193 | A2 | | 4/2008 | |
| WO | WO-2009012450 | A1 | * | 1/2009 | H01L 23/373 |
| WO | 2011/066489 | A2 | | 6/2011 | |
| WO | 2020/033632 | A2 | | 2/2020 | |
| WO | 2023/282976 | A2 | | 1/2023 | |

OTHER PUBLICATIONS

Zenou et al., "Laser sintering of copper nanoparticles", Journal of Physics D Applied Physics., vol. 47, 2014, 025501 11 pages 10.1088/0022-3727/47/2/025501.

Zinn et al., "Nanocopper as a soldering alternative: Solder-free assembly," 2016 IEEE 16th International Conference on Nanotechnology (IEEE—Nano), Sendai, Japan, 2016, pp. 367-370.

Zou et al., "Enhanced adhesion strength of silver paste on AlN ceramic substrate via sintered nano-CuO", Ceramics International, vol. 47, 2021, pp. 9471-9476.

A. A. Zinn, R. M. Stoltenberg, J. Chang, Y. Tseng and S. M. Clark, "Nanocopper as a soldering alternative: Solder-free assembly," 2016 IEEE 16th International Conference on Nanotechnology (IEEE—Nano), Sendai, Japan, 2016, pp. 367-370.

Allen et al., "Electrical sintering of nanoparticle structures", Nanotechnology, 2008, vol. 19, pp. 175-201. doi: 10.1088/0957-4484/19/17/175201.

Allen M.L., Aronniemi M., Mattila T., Alastalo A., Ojanpera K., Suhonen M., Seppa H. "Electrical sintering of nanoparticle structures". Nanotechnology. 2008;19:175201. doi: 10.1088/0957-4484/19/17/175201.

Armstrong et al., "Experimental investigation on the heat transfer performance analysis in silver nano-coated double pipe heat exchanger using displacement reaction", 2021 Materials Today: Proceedings, vol. 45, pp. 2482-2490.

Arts et al., "Qpace 2 and Domain Decomposition on the Intel Xeon PHI*"; Proceedings of Science, 2015, 15 Pages.

Back et al., "Design, Fabrication, and Characterization of a Compact Hierarchical Manifold Microchannel Heat Sink Array for Two-Phase Cooling Open Access", 2019, IEEE Transactions on Components, Packaging and Manufacturing Technology, vol. 9, No. 7, 8643536 pp. 1291-1300.

Balantrapu et al., "Inkjet printable silver dispersions: Effect of bimodal particle-size distribution on film formation and electrical conductivity", J. Mater. Res., 2010, vol. 25, pp. 821-827. doi: 10.1557/JMR.2010.0124.

Balantrapu K., McMurran M., Goia D.V. "Inkjet printable silver dispersions: Effect of bimodal particle-size distribution on film

(56) References Cited

OTHER PUBLICATIONS formation and electrical conductivity". J. Mater. Res. 2010;25:821-827. doi: 10.1557/JMR.2010.0124.
Brunschwiler et al., "Dual-Side Heat Removal by Silicon Cold Plate and Interposer with Embedded Fluid Channels", Proceedings of the 17th InterSociety Conference on Thermal and Thermomechanical Phenomena in Electronic Systems, ITherm, 2018, pp. 331-339.
Buffat et al., "Size effect on the melting temperature of gold particles", Phys. Rev. A., 1976, vol. 13, pp. 2287-2298. doi: 10.1103/PhysRevA.13.2287.
Buffat P., Borel J.P. "Size effect on the melting temperature of gold particles". Phys. Rev. A. 1976;13:2287-2298. doi: 10.1103/PhysRevA.13.2287.
Cheemalamarri et al., "Ti/Si interface enabling complementary metal oxide semiconductor compatible, high reliable bonding for inter-die micro-fluidic cooling for future advanced 3D integrated circuit integration", 2020, Journal of Micromechanics and Microengineering, vol. 30, No. 105005, pp. 1-12.
Deng et al., "Fabrication and Thermal Performance of a Novel Roll-Bond Flat Thermosyphon", Applied Thermal Engineering, vol. 181, 2020, pp. 15 Pages.
Denneulin A., Blayo A., Neuman C., Bras J. "Infra-red assisted sintering of inkjet printed silver tracks on paper substrates". J. Nanoparticle Res. 2011;13:3815-3823. doi: 10.1007/s11051-011-0306-2.
Denneulin et al., "Infra-red assisted sintering of inkjet printed silver tracks on paper substrates", J. Nanoparticle Res., 2011, vol. 13, pp. 3815-3823. doi: 10.1007/s11051-011-0306-2.
Ding et al., "Preparing of Highly Conductive Patterns on Flexible Substrates by Screen Printing of Silver Nanoparticles with Different Size Distribution"; Nanoscale Res. Lett., 2016, vol. 11, No. 412, pp. 1-8, doi: 10.1186/s11671-016-1640-1.
Ding J., Liu J., Tian Q., Wu Z., Yao W., Dai Z., Liu L., Wu W. "Preparing of Highly Conductive Patterns on Flexible Substrates by Screen Printing of Silver Nanoparticles with Different Size Distribution". Nanoscale Res. Lett. 2016;11:412. doi: 10.1186/s11671-016-1640-1.
Gradinger et al., "Assessment of Two-Phase Cooling of Power Electronics Using Roll-Bonded Condensers", Journal of Thermal Science and Engineering Applications, Mar. 2015, vol. 7; pp. 011002-1-8.
Grouchko et al., "Conductive Inks with a "Built-In" Mechanism That Enables Sintering at Room Temperature", ACS Nano, 2011, vol. 5, pp. 3354-3359; doi: 10.1021/nn2005848.
Grouchko M., Kamyshny A., Mihailescu C.F., Anghel D.F., Magdassi S. Conductive Inks with a "Built-In" Mechanism That Enables Sintering at Room Temperature. ACS Nano. 2011;5:3354-3359. doi: 10.1021/nn2005848.
Gu et al., "Fast near infrared sintering of silver nanoparticle ink and applications for flexible hybrid circuits", RSC Adv., 2018, vol. 8, pp. 30215-30222 doi: 10.1039/C8RA04468F.
Gu W., Yuan W., Zhong T., Wu X., Zhou C., Lin J., Cui Z. "Fast near infrared sintering of silver nanoparticle ink and applications for flexible hybrid circuits". RSC Adv. 2018;8:30215-30222. doi: 10.1039/C8RA04468F.
Gupta et al., "Experimental Study of Thermal Performance of Nanofluid-Filled and Nanoparticles-Coated Mesh Wick Heat Pipes", Journal of Heat Transfer, 2018, vol. 140, No. 10, pp. 102403-1-7.
Invitation to pay Additional Fee; PCT/US2022/029111; dated Feb. 21, 2023; 10 pages; European Patent Office.
Kang et al., "Sintering of Inkjet-Printed Silver Nanoparticles at Room Temperature Using Intense Pulsed Light", J. Electron. Mater., 2011, vol. 40, pp. 2268-2277. doi: 10.1007/s11664-011-1711-0.
Kang J.S., Ryu J., Kim H.S., Hahn H.T. "Sintering of Inkjet-Printed Silver Nanoparticles at Room Temperature Using Intense Pulsed Light". J. Electron. Mater. 2011;40:2268-2277. doi: 10.1007/s11664-011-1711-0.
Kundu et al., "Experimental and theoretical evaluation of on-chip micro heat pipe", 2015 Nanoscale and Microscale Thermophysical Engineering, vol. 19, No. 1, pp. 75-93.
Liu et al., "Recent Progress in Rapid Sintering of Nanosilver for Electronics Applications," Micromachines, 2018, vol. 9, No. 346, pp. 1-17, doi: 10.3390/mi9070346.
Magdassi et al "Triggering the sintering of silver nanoparticles at room temperature". ACS Nano. 2010;4:1943-1948. doi: 10.1021/nn901868t.
Magdassi et al., "Triggering the sintering of silver nanoparticles at room temperature", ACS Nano. 2010, vol. 4, pp. 1943-1948. doi: 10.1021/nn901868t.
Md. Khalilur Rahman1, Zhao Lu, and Kye-Si Kwon, "Green laser sintering of copper oxide (CuO) nano particle (NP) film to form Cu conductive lines," AIP Advances 8, 095008 (2018); https://doi.org/10.1063/1.5047562.
Michael Zenou, Oleg Ermak, Amir Saar and Zvi Kotler, "Laser sintering of copper nanoparticles," J. Phys. D: Appl. Phys. 47 (2014) 025501 (11pp).
Mo et al., "Silver Nanoparticles Based Ink with Moderate Sintering in Flexible and Printed Electronics." International journal of molecular sciences, vol. 20, No. 9, pp. 21-24, Apr. 29, 2019.
Mo, Lixin et al. "Silver Nanoparticles Based Ink with Moderate Sintering in Flexible and Printed Electronics." International journal of molecular sciences, vol. 20,9 p. 2124, Apr. 29, 2019.
Noh et al., "Femtosecond and nanosecond laser sintering of silver nanoparticles on a flexible substrate" 2020 Applied Surface Science, vol. 511, No. 145574, pp. 1-11.
Noh, Jihun & Ha, Jeonghong & Kim, Dongsik. "Femtosecond and nanosecond laser sintering of silver nanoparticles on a flexible substrate," Applied Surface Science. 511. 145574. 10.1016, 2020.
Perelaer et al., "Ink-jet Printing and Microwave Sintering of Conductive Silver Tracks", Adv. Mater., 2006, vol. 18, pp. 2101-2104. doi: 10.1002/adma.200502422.
Perelaer et al., "Microwave flash sintering of inkjet-printed silver tracks on polymer substrates", Adv., Mater. 2009, vol. 21, pp. 4830-4834. doi: 10.1002/adma.200901081.
Perelaer et al., "Plasma and microwave flash sintering of a tailored silver nanoparticle ink, yielding 60% bulk conductivity on cost-effective polymer foils", Adv. Mater., 2012, vol. 24, pp. 3993-3998. doi: 10.1002/adma.201200899.
Perelaer J., de Gans B.J., Schubert U.S. "Ink-jet Printing and Microwave Sintering of Conductive Silver Tracks". Adv. Mater. 2006;18:2101-2104. doi: 10.1002/adma.200502422.
Perelaer J., Jani R., Grouchko M., Kamyshny A., Magdassi S., Schubert U.S. "Plasma and microwave flash sintering of a tailored silver nanoparticle ink, yielding 60% bulk conductivity on cost-effective polymer foils". Adv. Mater. 2012;24:3993-3998. doi: 10.1002/adma.201200899.
Perelaer J., Klokkenburg M., Hendriks C.E., Schubert U.S. "Microwave flash sintering of inkjet-printed silver tracks on polymer substrates". Adv. Mater. 2009;21:4830-4834. doi: 10.1002/adma.200901081.
Rahman et al., "Green laser sintering of copper oxide (CuO) nano particle (NP) film to form Cu conductive lines", AIP Advances, vol. 8, No. 095008, 2018, pp. 1-14, https://doi.org/10.1063/1.5047562.
Rajkumar et al., "Comparison of Aluminium Roll Bond Evaporator With Geyser", Imperial Journal of Interdisciplinary Research (IJIR), vol. 3, Issue 5, 2017, pp. 841-848.
Schulz-Harder, "DBC substrates as a base for power MCM's", Proceedings of the Electronic Packaging Technology Conference, EPTC, 2000, pp. 315-320.
Shyjumon et al., "Structural deformation, melting point and lattice parameter studies of size selected silver clusters", Eur. Phys. J. D. 2005, vol. 37, pp. 409-415. doi: 10.1140/epjd/e2005-00319-x.
Shyjumon I., Gopinadhan M., Ivanova O., Quaas M., Wulff H., Helm C.A., Hippler R. "Structural deformation, melting point and lattice parameter studies of size selected silver clusters". Eur. Phys. J. D. 2005;37:409-415. doi: 10.1140/epjd/e2005-00319-x.
Tan, Y., et al., "Feasibility investigation and characterization of low-pressure-assisted sintered-silver bonded large-area DBA plates", Soldering and Surface Mount Technology, 2020, vol. 32, No. 3, pp. 129-136.
Vasiliev et al., "Heat transfer enhancement in mini channels with micro/nano particles deposited on a heat-loadedwall", 2012, Journal of Enhanced Heat Transfer, vol. 19, No. 1, pp. 13-24.

(56) References Cited

OTHER PUBLICATIONS

Wei Liu, Rong An, Chunqing Wang, Zhen Zheng, Yanhong Tian, Ronglin Xu, and Zhongtao Wang , "Recent Progress in Rapid Sintering of Nanosilver for Electronics Applications," Micromachines 2018, 9, 346; doi:10.3390/mi9070346.

* cited by examiner

SYSTEMS AND METHODS OF JOINING SUBSTRATES USING NANO-PARTICLES

PRIORITY APPLICATION

This application is a continuation of International Application No. PCT/US2022/029111 filed on May 13, 2022, which claims the benefit of priority to U.S. Provisional Application No. 63/192,184, filed on May 24, 2021, the content of which is relied upon and incorporated herein by reference in its entirety.

FIELD

Embodiments of the present invention relate generally to joining substrates, and more particularly, to joining substrates through partial fusing of nano-particles.

BACKGROUND

Photonic component assembly and deployment faces a challenge of maintaining precise alignment of single mode optical waveguides within a precise distance over the life of the product. Known joining methods currently used have many concerns.

For example, when organic adhesives, which require thermal or UV curing, are cured shrinkage may produce shifts that introduce unacceptable coupling losses between the components. In another example, solder reflow of co-packaged optics components, organic adhesives may be heated well above their glass transition temperature resulting in component misalignment. Additionally, organic adhesives may swell and take in water in damp heat testing or become distorted by strain associated with different Coefficients of Thermal Expansion (CTE) between the organic adhesive and the materials they are bonded to (e.g., glass, silicon, etc.).

Likewise, non-organic adhesives introduce other challenges. For example, laser welding of components using molten metals or frits may lead to large shifts in components as the welding materials cool and shrink in transitioning from their liquid to solid phases. Further, laser processing temperatures also introduce large thermal gradients in glass and silicon substrates that may produce cracks that may compromise long term reliability performance. As another example, sodium silicate bonding solutions require long cure times (>5 minutes), extending the time on the assembly bench. Additionally, sodium silicate materials undergo significant shrinkage on curing that must be addressed in the assembly approach through rigid fixturing.

Embodiments of the present invention provide improved bonding methods and systems using nano-particles.

BRIEF SUMMARY

Embodiments of the present invention provide for low-shift bonding of photonic components involving nano-particles, such as metal nano-particles partially or fully sintered to create a mechanical bond. Example metal nano-particles include nano-copper, nano-copper oxide, nano-silver, or nano-gold particles. The photonic components may be made of glass, metal, ceramics, or plastic, and may be in any shape, such as to include a flat surface, cylindrical surface, or raised features. In various embodiments herein, the photonic components may include or form a substrate or multiple substrates. The present invention affords precision alignment and attachment of the photonic components.

Some embodiments of the present invention utilize low shift sintering of nano-material, enabling active alignment and attachment of optical components without concern for drift of an adhesive curing or metal solidifications. Therefore, there are extremely thin bond lines yielding predictable gap distances between photonic components. Further, some embodiments of the present invention enable rework of previously joined nano-particle layers. Rework of previously joined nano-particle layers may be enabled by additional localized heating to promote atomic mobility on the surface of the nano-particles. A liquid shell, or other loosely bound layer around the nano-particles that could allow the joined nano-particles to be displaced slightly under an application of external force allows a realignment as the nano-particles remain in contact. In a small rework shift (e.g., 1-2 um) the nano-particles may experience minimal distortion.

Some embodiments of the present invention afford precision alignment, and attachments. The nano-particles may be applied to the substrate in a localized pattern, allowing the remainder of the substrates to be used as a datum surface. Further the methods of application allow a user to apply a layer of nano-particles in a precise and extremely thin layer. The precision and thinness enables evanescent coupling between planar waveguides (e.g., deposited dielectric waveguides, ion exchange waveguides, rib waveguides), in comparison to current methods using adhesives which have a tendency to flow, making the excessive adhesive hard to manage around the substrates.

Various example embodiments described herein are directed to joining photonic components by using low temperature heating to fuse nano-particles together, providing a low shift non-organic technique for bonding substrates together. In this regard, the use of nano-particles enables precision alignment and attachment of optical components. More particularly, in some embodiments, a thin layer of nano-particles, suspended in a medium, are applied to a substrate, a second substrate is pressed downward onto the nano-particle layer, while a heating element directs heat towards the layer of nano-particles, fusing the nano-particles together.

Some embodiments of the present invention heat the nano-particle layer to about 200° C. for about 2 seconds to partially sinter the nano-particles. The low temperature and short time period provides enough heat for surface diffusion of atoms to begin, joining the nano-particles at contact points. However, such low temperature and short time period does not provide enough heat for the nano-particles to denature in shape and form.

Embodiments of the present invention create a mechanical bond between nano-particles utilizing partial sintering. Mechanical bonds, unlike electrical bonds, only require the nano-particles fuse at contact points, while the nano-particles retain their shape. Electrical bonds require full sintering of the nano-particles to reduce, collapse and close the internal voids between the nano-particles to increase the conductivity of the bond. Full sintering is conducted at high temperatures for a longer time, in comparison to partial sintering. Since electrical conductivity is unnecessary for a mechanical bond, partial sintering to fuse the nano-particles at contact points allows for a desirable high precision bond.

Various embodiments of the present invention join substrates with nano-particles. In some embodiments, a Fiber Array Unit (FAU) may be created by joining fibers of a fiber array to a V-groove substrate, by partially joining nanoparticles. In some embodiments, the V-groove FAU may be lidded, and the lid may be joined to the fibers by partially sintered nano-particles.

In one embodiment of the present invention, optical fibers may be attached to a V-grooved substrate to create a V-groove fiber array unit. The V-groove substrate may be a V-groove chip. A layer of nano-particles may be applied onto each of the sidewalls of the V-groove substrate. The optical fibers may be aligned in the V-grooves, and pressed downward to ensure contact to the V-groove substrate. Heat (e.g., via a laser) may be directed towards the nano-particles through either the fiber or the substrate to partially sinter the nano-particles. In some embodiments, a lid may be applied to the FAU after the fibers are joined to the substrate.

In a further embodiment, the ends of the optical fibers may be cleaved so they are all the same length. After the fibers are of the same length, the FAU may be oriented to be joined to a planar light wave circuit (PLC) waveguide. A layer of nano-particles may be applied to the PLC waveguide such that the nano-particles are not directly over the waveguide to reduce scattering. The FAU may be lowered into contact with the PLC waveguide such that the core of the optical fiber, and the waveguide are laterally and rotationally aligned. After alignment, the nano-particles may be heated and joined yielding a FAU interconnection with a PLC waveguide that can survive exposure to solder reflow temperatures without misaligning components.

In another embodiment of the present invention, optical fibers may be joined to a flat substrate to create a FAU. A layer of nano-particles may be applied to the flat substrate and the fibers may be aligned in the desired location. An alignment substrate, for example a V-grooved alignment substrate or a squeeze pad, may be used to align and hold the fibers in the precise location while a heat is directed at the nano-particles. After the nano-particles are fused, the alignment substrate may be removed.

In a further embodiment of the present invention, the FAU may be interconnected with a PLC planar waveguide. Once the FAU is orientated for connection a layer of nano-particles may be applied to the PLC planar waveguide. The FAU is lowered on the layer of nano-particles so the core of the fiber and the waveguide are laterally and rotationally aligned. After alignment the nano-particles are heated and joined, resulting in a FAU interconnection with the PLC waveguide. In some embodiments, in lieu of the layer of nano-particles a precision spacer substrate may be used along with two thin layers of nano-particles.

In yet another embodiment of the present invention, evanescent coupling may be achieved between two PLC planar waveguides. A thin layer of nano-particles may be applied to a first PLC planar waveguide, such that the nano-particles are not applied directly over the waveguide. A second PLC waveguide may be oriented and aligned on top of the first PLC waveguide so the two waveguides are laterally and rotationally aligned. Once the second PLC waveguide is lowered onto the first PLC waveguide, the nano-particles are heated and joined resulting in an evanescent coupling of planar waveguides.

In an example embodiment, a method for joining photonic components is provided.

The method comprises suspending nano-particles in a medium, wherein the nano-particles include metal nano-particles. The method further includes applying a layer of the nano-particle medium to a first substrate, exposing the layer of nano-particle medium to a thermal process to remove at least a portion of the medium and expose the nano-particles, placing a second substrate on the nano-particles in alignment with the first substrate, and causing application of heat to the nano-particles to cause connection of contact points between adjacent nano-particles to cause secure alignment of the first substrate and the second substrate, wherein the heat applied to the nano-particles is less than 300° C.

In some embodiments, at least one of the first substrate and the second substrate is one of a glass substrate, a silicon substrate, or a ceramic substrate.

In some embodiments, at least one of the first substrate and the second substrate is one of a precision flat fusion glass or a precision V-groove substrate.

In some embodiments, the heat applied to the layer of nano-particles is less than 250° C.

In some embodiments, the heat applied to the layer of nano-particles is for less than 2 seconds.

In some embodiments, heat is applied to the layer of nano-particles until partial sintering occurs.

In some embodiments, causing the application of heat to the nano-particles causes contact points between adjacent nano-particles to engage in particle necking.

In some embodiments, heat is applied until particle necking occurs and is ceased before material coalescence occurs.

In some embodiments, the thermal process is one of oven heating, laser heating, microwave heating, RF heating, infrared heating, visible light heating, ultraviolet heating, or Joule heating.

In some embodiments, the nano-particles are one of nano-copper, nano-silver, or nano-gold.

In some embodiments, the application of heat to the nano-particles is via either oven heating, laser heating, microwave heating, RF heating, infrared heating, visible light heating, ultraviolet heating, or Joule heating.

In some embodiments, the medium is one of a solvent-based slurry, a paste, an ink, or a liquid solvent.

In some embodiments, the layer of nano-particle medium is applied by screen printing, three-dimensional printing, transfer printing, aerosol spraying, or doctor blade application.

In some embodiments, the medium comprises one or more filler particles that each have a maximum height smaller than a desired gap thickness between the first substrate and the second substrate, where the filler material can be nano-particle or other material formed with a specific diameter.

In some embodiments, the heated nano-particles form partially sintered nano-particles, and wherein the method further comprises disposing an adhesive about the partially sintered nano-particles between the first substrate and the second substrate.

In some embodiments, the method further includes aligning the second substrate onto the first substrate with a third substrate.

In some embodiments, the method further comprises applying a second layer of the nano-particle medium to a third substrate; exposing the second layer of the nano-particle medium to a second thermal process to remove at least a portion of the medium and expose second nano-particles from the second layer of the nano-particle medium; placing the third substrate on the second substrate; and causing application of heat to the second nano-particles to cause connection of contact points between adjacent second nano-particles to secure alignment of the second substrate and the third substrate, wherein the heat applied to the second nano-particles is less than 300° C. In some embodiments, the method further comprises applying a third layer of the nano-particles medium to a fourth substrate; exposing the third layer of the nano-particle medium to a third thermal process to remove at least a portion of the medium and expose third nano-particles from the third layer of the nano-particle medium; and placing the fourth substrate between the first substrate and the third substrate such that a core of the second substrate and a planar waveguide of the third substrate are aligned.

In some embodiments, the layer of nano-particles is discontinuous, and placing the second substrate on the layer of discontinuous nano-particles comprises aligning a first ion exchange waveguide of the first substrate with a second ion exchange waveguide of the second substrate such that the layer of nano-particles is discontinuous where the first ion exchange waveguide and the second ion exchange waveguide are aligned.

In another example embodiment, an assembly comprises a first substrate, a second substrate, and a layer of partially sintered nano-particles joining the first substrate to the second substrate. The layer of partially sintered nano-particles is formed via application of heat to cause connection of contact points between adjacent nano-particles, wherein the heat applied to the nano-particles is less than 300° C.

In yet another example embodiment, an assembly of joined photonic components made by a process comprises suspending nano-particles in a medium, wherein the nano-particles include metal nano-particles; applying a layer of the nano-particle medium to a first substrate; exposing the layer of nano-particle medium to a thermal process to remove at least a portion of the medium and expose the nano-particles; placing a second substrate on the nano-particles in alignment with the first substrate; and causing application of heat to the nano-particles to cause connection of contact points between adjacent nano-particles to cause secure alignment of the first substrate and the second substrate, wherein the heat applied to the nano-particles is less than 300° C.

In yet another example embodiment, a method for joining photonic components comprises suspending nano-particles in a medium, wherein the nano-particles include metal nano-particles; applying the nano-particle medium to an exterior surface of a plurality of filler particles; applying the plurality of nano-particle coated filler particles to a first substrate; placing a second substrate on the plurality of nano-particle coated filler particles in alignment with the first substrate; and causing application of heat to the layer of nano-particles to cause connection of contact points between adjacent nano-particles to cause secure alignment of the first substrate and the second substrate, wherein the heat applied to the layer of nano-particles is less than 300° C.

In some embodiments, the plurality of filler particles each have a maximum height smaller than a desired gap thickness between the first substrate and the second substrate.

In yet another example embodiment, a system for joining photonic components comprises a mixer configured to suspend nano-particles in a medium, wherein the nano-particles include metal nano-particles. The system further comprises an applicator configured to apply a layer of the nano-particle medium to a first substrate and at least one heater configured to apply heat to the layer of nano-particle medium to remove at least a portion of the medium and expose the nano-particles. The system further includes an alignment mechanism configured to position a second substrate on the nano-particles in alignment with the first substrate. The at least one heater is configured to apply heat to the nano-particles at no more than 300° C. to cause connection of contact points between adjacent nano-particles to cause secure alignment of the first substrate and the second substrate.

In yet another example embodiment, a method for joining photonic components comprises suspending nano-particles in a medium, wherein the nano-particles include metal nano-particles; applying a layer of the nano-particle medium to a first substrate; placing a second substrate on the nano-particles in alignment with the first substrate; displacing the nano-particles between the first substrate and second substrate by force applied between the first substrate and the second substrate; and causing application of heat to the nano-particles to cause connection of contact points between adjacent nano-particles to cause secure alignment of the first substrate and the second substrate, wherein the heat applied to the nano-particles is less than 300° C.

In yet another example embodiment, a fiber array unit assembly comprises a first substrate, at least one fiber, and a layer of partially sintered nano-particles joining the first substrate to the at least one fiber. The layer of partially sintered nano-particles is formed via application of heat to cause connection of contact points between adjacent nano-particles, wherein the heat applied to the nano-particles is less than 300° C.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1B:
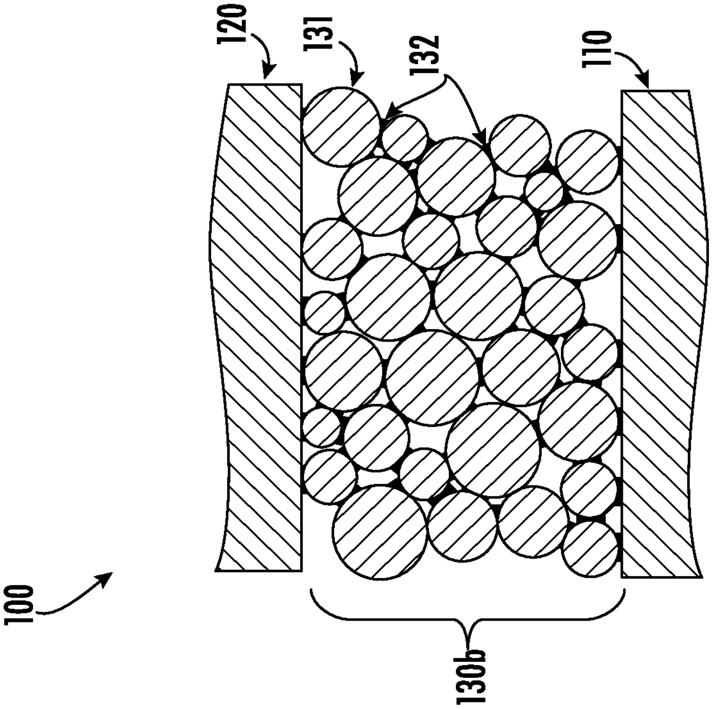
FIG. 1B illustrates a cross-section of the thin layer of nano-particles shown in FIG. 1A after particle joining, in accordance with some embodiments discussed herein.

Some example embodiments will now be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

The term "nano-particle" as used herein may refer to a material which is small in size (e.g., between 1 and 100 nm in diameter (or height)). Such a nano-particle may be, for example, a metal nano-particle, which may, for example, include nano-copper, nano-gold, or nano-silver particles.

The term "medium" as used herein may refer to a liquid solvent, such as to be mixed with nano-particles to form a substance to apply to the components to be bonded. Such a liquid solvent may be, for example, a paste, a solvent-based slurries, an ink, or any solvent which suspends the nano-particles for application.

The term "necking" as used herein may refer to the joint or bond formed between connection points of adjacent nano-particles.

The term "heating" as used herein may refer to an application of energy, such as heat. Example application may occur, for example, with a laser, through an oven, via radio frequency, infrared, visible, or ultraviolet light, or microwave heating.

The term "fused" as used herein may refer to a various levels of joinder between two or more nano-particles. For example, the nano-particles may be fused through partial sintering, full sintering, etc.

The term "substrate" as used herein may refer to a material which provides a surface for a material to be deposited thereon.

The term "precision" as used herein may have the meaning less than 0.5 vim deviation from a desired surface contour, preferably less than 0.2 vim or more preferably less than 0.1 vim.

As noted herein, glass, metal, metal-coated, and other material substrates, may be joined together using fused nano-particles, such as nano-silver and nano-copper powders in accordance with embodiments of the present invention.

Embodiments of the present invention provide for low-shift bonding of substrates involving nano-particles, such as metal nano-particles partially sintered to create a mechanical bond. Example metal nano-particles may include nano-copper, nano-copper oxide, nano-silver, and nano-gold particles, although other metal nano-particles are considered. The substrates may be made of glass, silicon, ceramics, metal, plastic, or a combination thereof, and may be in any shape including a flat surface, cylindrical surface, and may include raised features. In various embodiments, the substrates are photonic components, and the present invention affords precision alignment and attachment of the photonic components.

Some embodiments of the present invention utilize low shift sintering of nano-materials, enabling active alignment and attachment of optical components without concern for drift of an adhesive curing or metal solidification. Therefore, there are extremely thin bond lines yielding predictable gap distances between the photonic components. In some embodiments, the thin bond lines may be less than 1 um, less than 0.5 um, or less than 0.2 um thick.

Various embodiments of the present invention utilize low temperature heat for short periods of time to partially sinter nano-particles—thereby providing a low shift non-organic joining technique. Some embodiments of the present invention heat the nano-particle layer to about 200° C. for about 2 seconds to partially sinter the nano-particles. The low temperature and short time period provides enough heat for surface diffusion of atoms to begin to join the nano-particles at contact positions without causing the nano-particles to denature in shape and form.

Some embodiments of the present invention create a mechanical bond between nano-particles utilize partial sintering. Notably, such embodiments may employ lower heat and reduced heating time because there is no need to form a low resistance electrical bond. In this regard, electrical bonds would require full sintering of the nano-particles to reduce, collapse and close the internal voids between the nano-particles to increase the conductivity of the bond. Full sintering, however, is conducted at high temperatures for a longer time, in comparison to partial sintering. Since electrical conductivity is unnecessary for a mechanical bond, partial sintering to fuse the nano-particles at contact points allows for a high precision bond without some negative side effects caused by heating at higher temperatures and for longer periods of time.

In some embodiments, the nano-particles may be sintered in an inert atmosphere, or in a reactive reducing atmosphere.

Reducing chemical agents may also be incorporated into the medium to promote nano-particle contact during heating. In some embodiments, the nano-particles (e.g., silver or copper nano-particles) may be sintered in air. Unlike in electrical applications where removal of Copper (II) Oxide (CuO) is necessary to reduce electrical resistance, the inert environment is not a requirement for precision mechanical bonding—such as contemplated with various embodiments of the present invention.

Figure 1A:
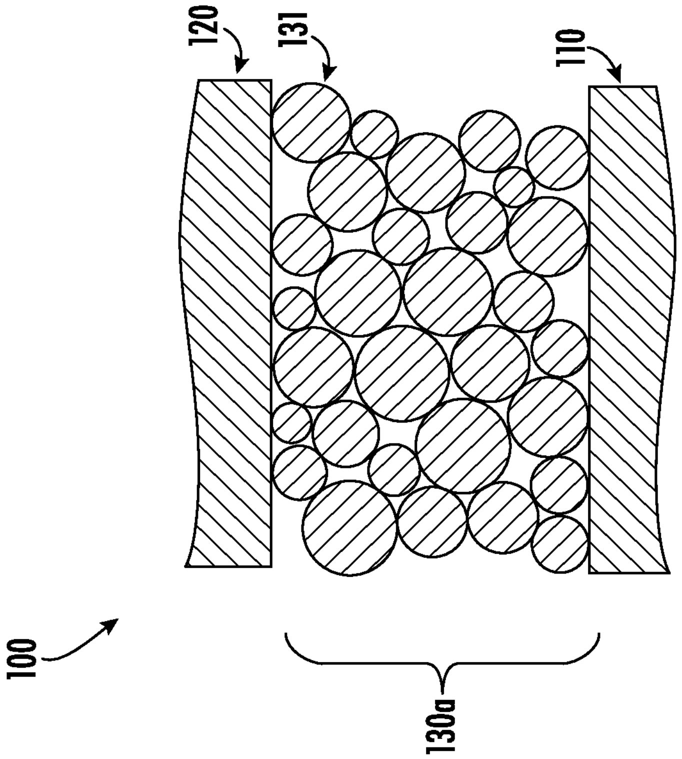
FIG. 1A illustrates a cross-section of thin layer of nano-particles positioned between two substrates prior to particle joining, in accordance with some embodiments discussed herein.

A mechanical bond may be formed by fusing of nano-particles disposed between two substrates. FIG. 1A illustrates a cross-sectional view of a first substrate 110 and a second substrate 120 with a thin layer of nano-particles 130*a* disposed between the first and second substrates, prior to the nano-particles 131 of the layer of nano-particles 130*a* being fused together. Before application of the nano-particles onto the first substrate, the nano-particles 131 may be suspended in a medium, such as a solvent or a paste. The nano-particle medium may be deposited onto the first substrate and exposed to a thermal process. The thermal process is configured to remove at least part of the medium which allows the nano-particles 131 to pack together and make point contacts with adjacent (e.g., neighboring) nano-particles between the first substrate and the second substrate. Additionally or alternatively, the thermal process may drive off suspension materials slowly, preventing bubbles that may create voids in the thin layer of nano-particles 130*a*.

With the nano-particles exposed, such as shown in FIG. 1A, the nano-particles may be heated to begin fusing together at their contact points. FIG. 1B illustrates the first substrate 110 and the second substrate 120 joined by the layer of nano-particles after exposure to a heating process yielding a layer of joined nano-particles 130*b*. Each of the nano-particles 131 in layer 130*b* illustrates particle necking connections at the neck regions 132 with adjacent nano-particles 131 between the first substrate and the second substrate.

Nano-particles, due to the extremely small diameter, have different properties than bulk metals. For example, the melting point of nano-particles is much lower (e.g., 150° C.-300° C.) than the melting point of the bulk metals (e.g., 1084° C. for copper and 961° C. for silver). The low melting point arises from surface energy difference associated with extremely small diameter metal particles (e.g., 30-70 nm diameter), where surface atoms are more weakly bound to the crystal lattice, enabling them to migrate on the surface. When the nano-particles are heated to these temperatures, atoms on the surface of the nano-particles become mobile and start to rearrange in a way that minimizes the total surface energy of the nano-particle. The surface atoms gather at the contact points between two adjacent nano-particles (i.e., the neck region), while the interior atoms do not shift such that the diameter of the nano-particle does not change significantly. As a result, particle necking occurs when the nano-particles are heated to a relatively low temperature (e.g., 200° C.).

Particle necking may be achieved through partial sintering. Partial sintering involves heating the nano-particles to low temperatures (e.g., 200° C.) so that adjacent nano-particles bond at contact points, while retaining their shape. Full sintering, in comparison, involves heating the nano-particles until the nano-particles deform, and fuse together at more than the initial contact points. Notably, full sintering reduces the resistivity of the nano-particles to achieve a conductive bond.

Figure 2A:
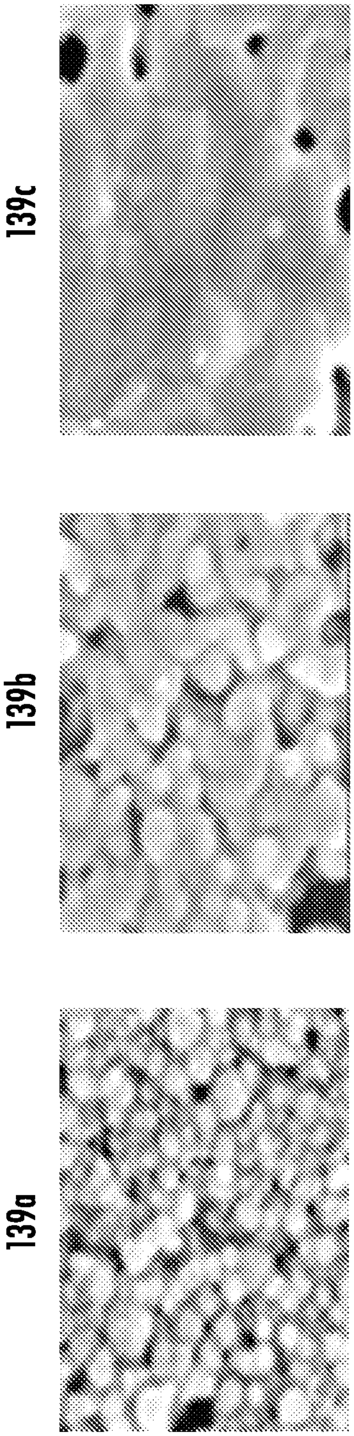
FIG. 2A illustrates nano-particles after various stages of sintering, in accordance with some embodiments discussed herein.

As heat is applied to nano-particles, the shape of the nano-particles begin to change. Notably, as higher temperatures and/or more exposure time occurs, the particles denature more. FIG. 2A illustrates a layer of nano-copper-filled ink at various stages of laser heating (e.g., sintering). The first image 139*a* illustrates nano-particles after an initial heating (e.g., a first thermal process to remove the medium), wherein organic materials about the nano-particles have been partially removed. The second image 139*b* illustrates nano-particles after partial sintering. Here the nano-particles are bonded at their contact points, while retaining their original shape. The third image 139*c* illustrates the nano-particles after full sintering. Here the nano-particles have experienced extensive shape changes due to material coalescence and void filling and closure.

Laser heating in electrical interconnections, as discussed and illustrated above, requires the nano-particles to be heated to the point that internal voids close and collapse, or nearly collapse, to minimize the electrical resistance (e.g., 139*c* of FIG. 2A). However, for mechanical bonds, high electrical conductivity is not a requirement, whereas sufficient nano-particle joining to resist distortion of joined components (e.g., substrates) under stresses that may lead to misalignment is a requirement. As sintering progresses from 139*a* to 139*b*, the joined nano-particle network shrinks between 0-1%, and the shear strength of the bond increases to about 10 MPa. In comparison, as sintering progresses from 139*a* to 139*c*, the joined nano-particles shrinks about 5-10%, shear strength of the joints increases to between 50-60 MPa, as the shrinkage force increases it becomes harder for the nano-particles to resist tendency to shrink and bond, and the electrical resistivity is reduced.

In some embodiments, the magnitude of joint shrinkage is correlated to the initial nano-particle layer thickness. For example, if a 1.0 um thick nano-particle layer is deposited on a surface, it may shrink by 10-20 nm on initial laser heating, and up to 100 nm on full sintering. Therefore, full sintering may be desirable to maximize bond strength, but may lead to an unacceptable component shift. In some embodiments, the component shift may be avoided by displacing the nano-particle layer during assembly (e.g., applying pressure to the nano-particle layer, such as when the first and second substrate are brought together). In such an embodiment, as the nano-particles are able to flow under the application of pressure, a thin layer of nano-particles may be formed between the two substrates. In some such embodiments, the thin layer of nano-particles may be fully sintered for maximum shear strength, since the component shift will be negligible.

Figure 2B:
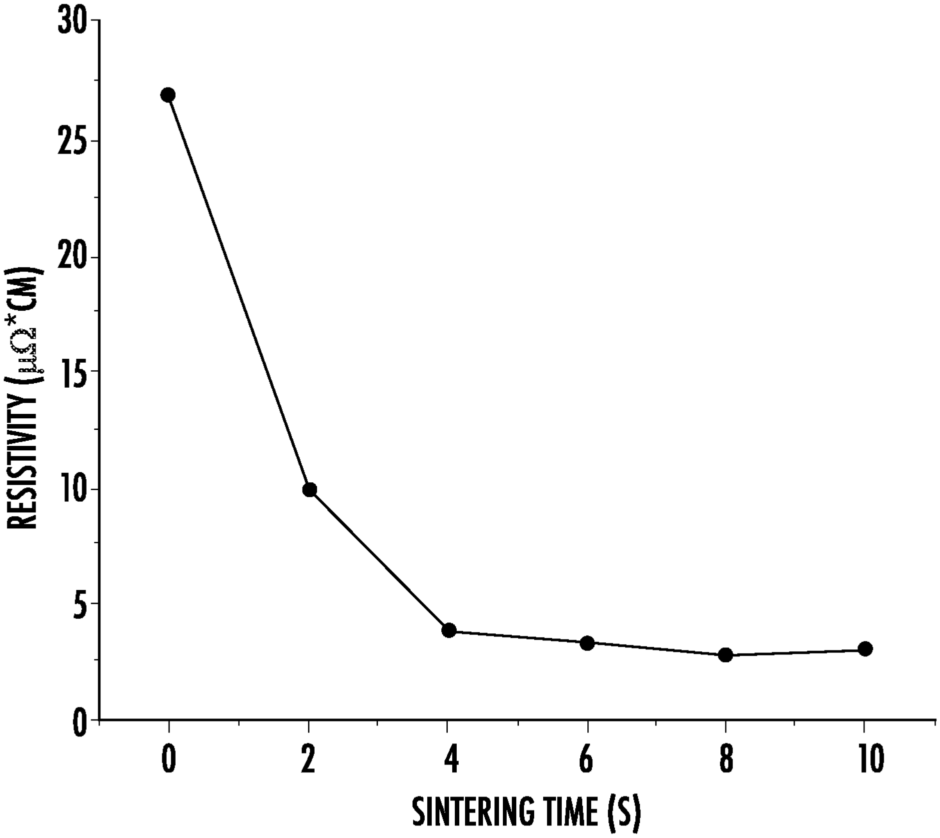
FIG. 2B illustrates the change in electrical resistivity of the nano-particles as a function of laser heating and time, in accordance with some embodiments discussed herein.

As the shape of the nano-particles change to fill the internal voids, the resistivity of the bond decreases (e.g., conductivity increases). FIG. 2B is a chart illustrating the change in the resistivity of the nano-particles as sintering time increases (e.g., progress from 139*a*-139*c* of FIG. 2A). Although a low resistivity is necessary for successful electrical connections, a mechanical bond between the nano-particles occurs before the nano-particles are fully sintered and, thus, full sintering is not necessary.

Figure 3:
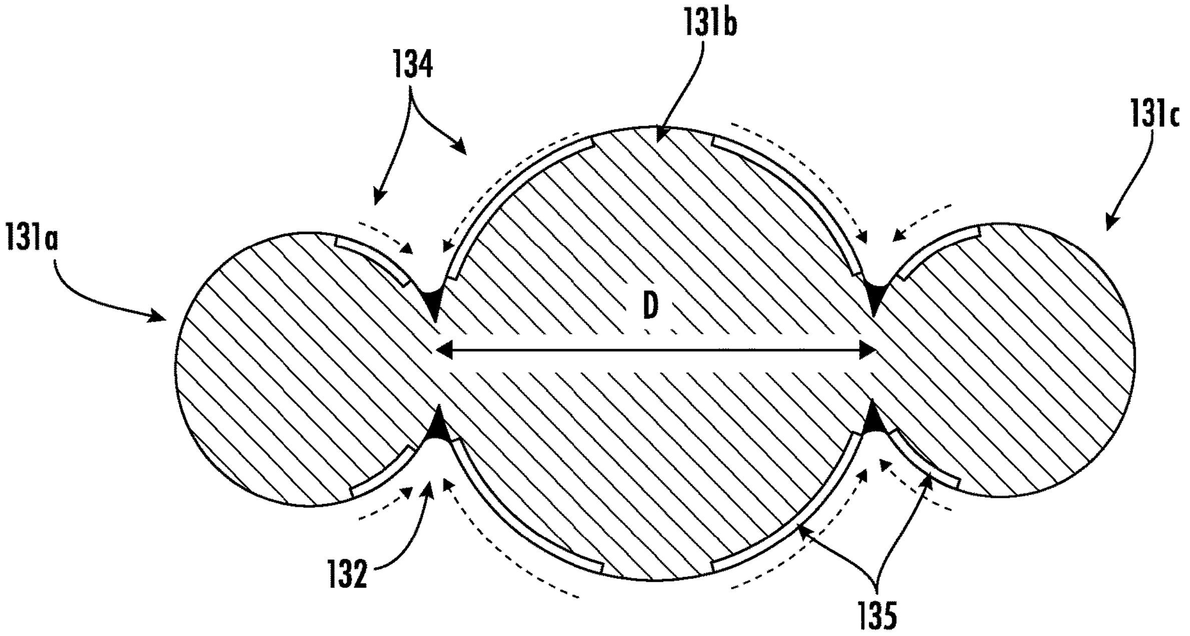
FIG. 3 illustrates surface diffusion of atoms on nano-particles to neck regions where adjacent nano-particles contact each other, in accordance with some embodiments discussed herein.

As discussed above, the overall shape of nano-particles does not change after initial heating, however, as heating continues the shape of the nano-particles begins to change until full sintering occurs. FIG. 3 illustrates three nano-particles 131*a*, 131*b*, 131*c*, after initial heating. As the nano-particles are heated at a relatively low temperature, the atoms on the surface of the nano-particles become mobile and start to rearrange to minimize surface energy, driving surface diffusion of atoms 134 to the narrow neck regions 132. As the atoms collect in the neck regions 132, the total surface area is reduced. Further, other surface locations 135 on the nano-particles experience a depletion of surface atoms, but internal atoms remain trapped in the nano-particle's crystal lattice. As the neck regions 132 grow during initial heating, the distance D across the nano-particles does not change significantly. As a result, the network of nano-particles does not shrink significantly.

In this regard, a thin layer of nano-particles may be used for kinematic alignment and the precision external geometry of the optical components is used to establish alignment. In some embodiments, a nano-particle layer may be deposited on components in extremely thin layers, for example, 0.1 um, such that the nano-particle presence between optical components does not introduce mechanical misalignment of components. In some embodiments, the extremely thin layer may be less than 1 um, less than 0.5 um, or less than 0.2 um thick.

Similarly, thick layers of nano-particles may be suitable for applications where active alignment of optical components is required. A thick layer of nano-particles may be greater than 10 um, greater than 20 um, greater than 50 um, or greater than 100 um in thickness. A thick nano-particle layer may span a gap between two optical components, and then deform to accommodate the relative motion of one optical component to another during active alignment. Once the two optical components are properly aligned, initial laser heating (or other suitable sintering method) joins the nano-particles without introducing significant shrinkage. The nano-particles may serve as a temporary or permanent bond to hold the optical components in alignment. Although optical components are discussed with reference to alignment, other substrates are considered.

Nano-particles such as nano-silver, and nano-copper are suitable for bonding to glass substrates, metal, and metalized substrates and components. In some embodiments, optical fibers and glass substrates may be metalized (e.g., by traditional metal evaporation or sputtering processes) to enhance joining and increase joint shear strength as compared to nano-particle joints directly on glass substrates.

In some embodiments, during subsequent optical components assembly, a layer of nano-particles may be applied on one or more optical components that have been previously metalized using either traditional metallization or sintered nano-particle coatings. The second layer of nano-particles may provide a bond between the optical components, and enhance joining to the metallization layer.

Various techniques may be used to prepare and deposit a layer of nano-particles onto a substrate. In some embodiments, the nano-particles are suspended in a medium (e.g., a paste) and applied to selected regions of the substrate through stencil openings in a screen printing screen, enabling thin (e.g., the thickness of the screen) or thick (e.g., 5-100 um) layers.

In some embodiments, the nano-particles may be suspended in solvent-based slurries. The slurries may then be printed onto the substrate via ink jet printing, enabling thin films (e.g., 0.1-5 um) over localized regions with small dimensions (e.g., 20-50 um). Ink jet printing may allow the layer of nano-particles to be printed precisely at any location on the substrate (e.g., the region where the optical fiber will be placed in contact with the substrate). In some embodiments, prior to sintering, the solvent may be evaporated by exposure to vacuum and/or moderate oven temperatures (e.g., 60-90° C.).

In some embodiments, the nano-particles may be suspended in a slurry or ink, and applied through transfer printing to selected locations of a drum or print pad, wherein the drum or print pad is subsequently applied to the surface of the substrate to transfer the ink or slurry.

In some embodiments, the nano-particles may be suspended in a liquid solvent and sprayed over a substrate surface using an aerosol sprayer or air brush. In some embodiments, the spray may be masked to only apply nano-particles to select surfaces of the substrate.

In some embodiments, the nano-particles may be suspended in a slurry, and the slurry may be applied over a substrate using doctor blade deposition techniques. Although application methods have been discussed herein, other application methods are contemplated.

In some embodiments, the medium may include filler material. The filler material may be a low-expansion filler material to reduce the coefficient of thermal expansion (CTE) mismatch between the nano-particles and the substrate (e.g., glass, silicon). Once the medium is partially removed via a thermal process, the filler material remains. The CTE of exposed nano-particles and filler material layer may be heavily influenced by the CTE of the filler material, thereby reducing the CTE mismatch between the layer (e.g., exposed nano-particles and filler material combination) and the substrates. The nano-particles may be bonded to materials with differing CTE's as the nano-particles are able to distort within a range defined by the size of interstitial voids of the filler material, as the nano-particles are sintered. The distortion of the nano-particles allows the difference between the CTE of the nano-particles and the CTE of the substrate to differ by more than 1 ppm/K, more than 2 ppm/K, more than 5 ppm/K, more than 10 ppm/K, or more than 20 ppm/K.

Figure 4B:
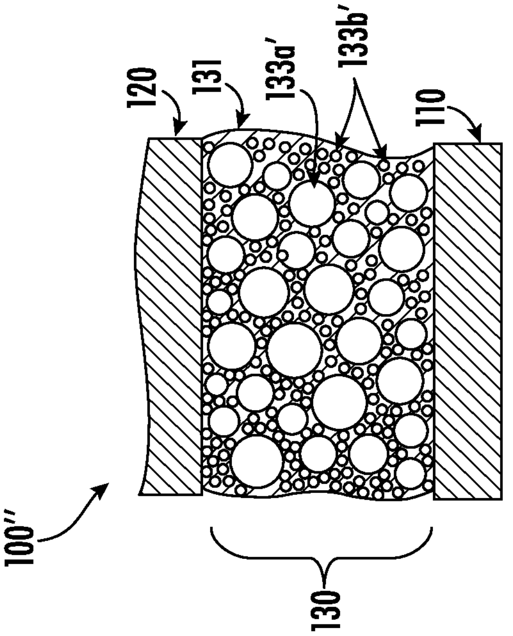
FIG. 4B illustrates a cross-section of a layer of nano-particles with a bi-modal distribution of low expansion filler particles, in accordance with some embodiments discussed herein.
Figure 4A:
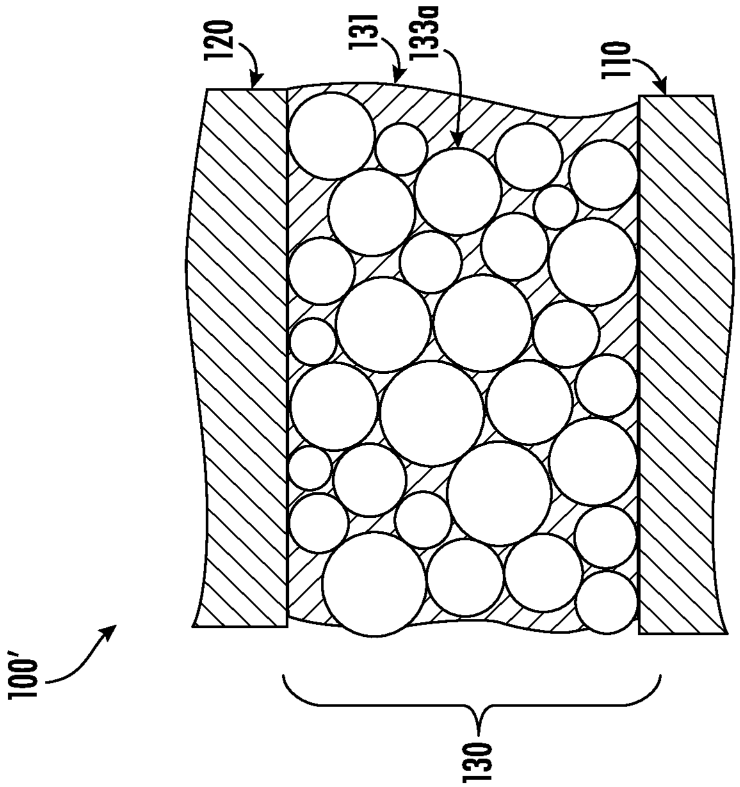
FIG. 4A illustrates a cross-section of a layer of nano-particles with a low expansion filler particle added, in accordance with some embodiments discussed herein.

Filler materials, having a much larger diameter than nano-particles, may make up a large portion of mechanical bond between substrates. FIG. 4A illustrates a cross-sectional view 100' of filler material 133*a* added into a layer of nano-particles 130. The nano-particles 131 as illustrated, are considerably smaller than the filler material 133*a*. As such, the nano-particles do not appear as discrete particles, as seen in other figures. The filler material 133*a* may be selected for its chemical properties, such as the ability to form strong bonds with the selected nano-particles during sintering. Example filler materials are silica, silicon carbide, or graphite powders. In some embodiments, the filler material may be selected to enhance heating of neighboring nano-particles during sintering. For example, filler material may be selected because of its ability to absorb light at specific wave lengths, or ability to absorb microwave radiation.

The filler material may be selected so that the diameter of the filler material is smaller than the target thickness of the nano-particle layer. In some embodiments, the target thickness may be 4 times as thick as the filler material diameter. FIG. 4B illustrates a cross section 100" illustrating a filler material having a bimodal particle size distribution. A bimodal filler material may include a large filler material 133*a*' and a small filler material 133*b*'. In some embodiments, the mean diameter of the large filler material 133*a*' is about 7 times as large as the mean diameter of the small filler material 133*b*'. The large filler material and small filler material may be made of the same material, or two different materials, both having a low CTE.

Figure 4D:
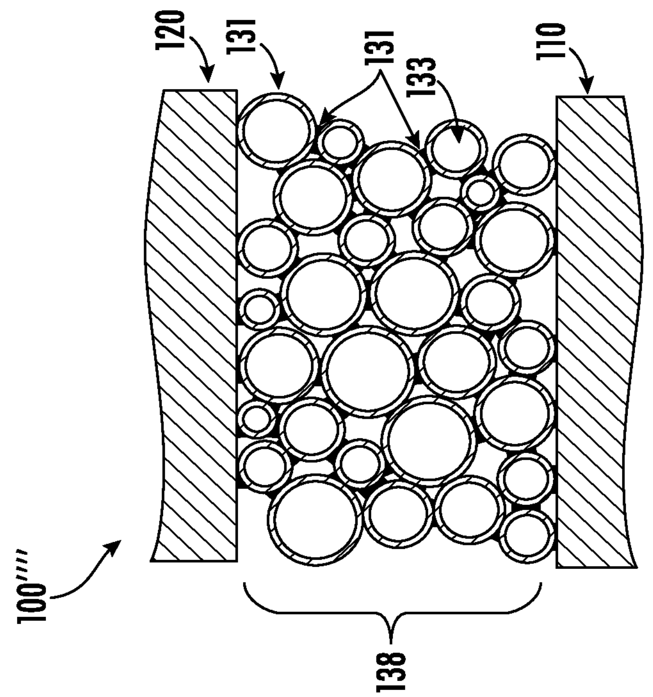
FIG. 4D illustrates a cross-section of a layer of filler particles coated with a thin layer of nano-particles, in accordance with some embodiments discussed herein.
Figure 4C:
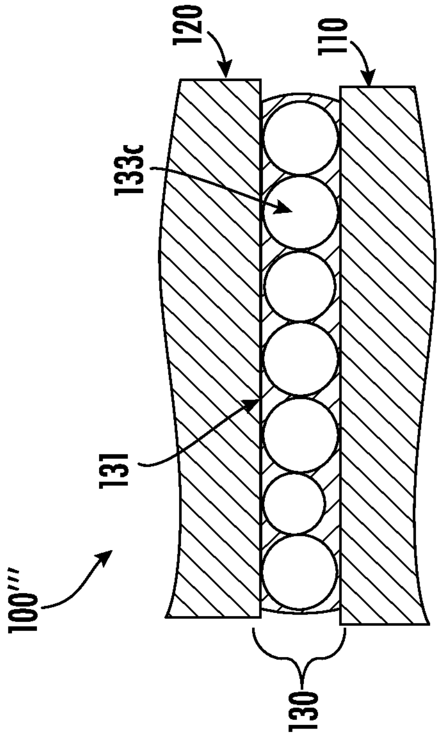
FIG. 4C illustrates a cross-section of a layer of nano-particles with a precision diameter filler particle, in accordance with some embodiments discussed herein.

Filler material may also be chosen with a precisely fabricated diameter to closely ensure the thickness of the mechanical bond between substrates. FIG. 4C illustrates a cross-sectional view 100—of two substrates joined by a layer of nano-particles 130 including a precision filler material 133*c*. In some embodiment the precision filler material 133*c* may be used as a thickness spacer for a thin layer of nano-particles 130. In some embodiments, the precision filler material 133*c* is nano-particle material fabricated with a precise diameter.

In some embodiments, the amount of nano-particles used may be reduced by coating filler material with nano-particles. With reference to the cross-sectional view 100"" illustrated in FIG. 4D, nano-particle coatings may be applied on the surface of filler material 133 using a spray drying process or another chemical process that promotes nano-particle layer formation on filler material via, for example, pH modification and/or electrostatic attraction. The joining layer 138 of nano-particle coated filler material 133 may minimize the amount of nano-particle material needed, which may reduce production costs. Further, since the size of the filler material 133 does not change (i.e., shrink) during heating, the thickness of the joining layer 138 may be more precise.

As discussed herein, heating nano-particles may be accomplished through different mechanisms. Some mechanical bonds only need to be heated in specific locations. Laser heating may be used to sinter nano-particles at localized locations. For example, a focused laser beam may sinter nano-particles located directly under an optical fiber, while not heating a neighboring nano-particle joint that has already been laser sintered. Laser heating may provide precise control over heating temperature by adjusting laser power, and pulse duration. The focal spot of the laser and time/power profile of the laser may be adjusted to minimize thermal gradients in glass components, minimizing built in stresses that may lead to long term failures.

In some embodiments, there may be nano-particles in multiple locations to be heated simultaneously. Radio Frequency (RF) and microwave heating may be used to join multiple optical components at multiple locations at the same time. For example, fibers in a fiber array may be simultaneously bonded to a common glass substrate in a single operation.

Figure 5B:
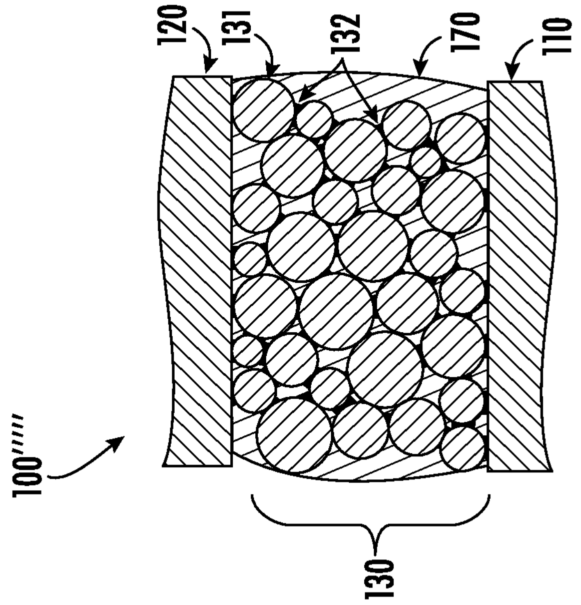
FIG. 5B illustrates a cross-section of a layer of nano-particles joining two substrates with joint infiltration with an organic adhesive, in accordance with some embodiments discussed herein.
Figure 5A:
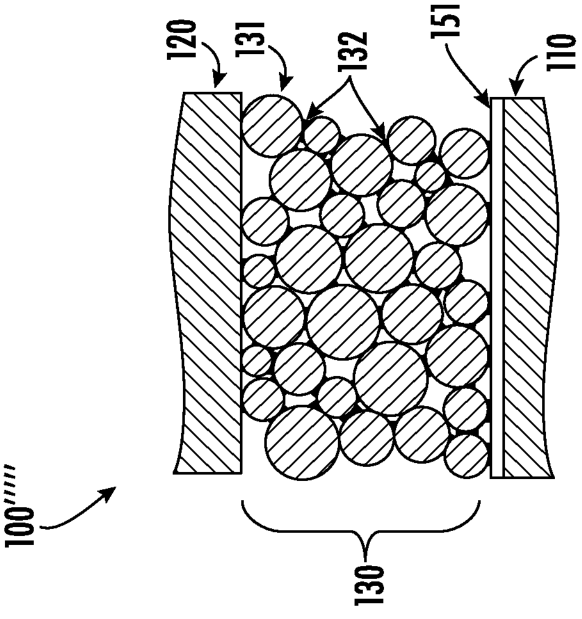
FIG. 5A illustrates a cross-section of a layer of nano-particles including an electrode to aid in heating of the nano-particle layer, in accordance with some embodiments discussed herein.

In some embodiments, Joule heating may be used for localized heating of nano-particles, such as illustrated in the cross-sectional view 100—of FIG. 5A. The layer of nano-particles 130 may be applied on an electrode 151 on the first substrate 110. When current flows through the electrode 151, the nano-particles 131 therein are heated and join together at contact points to engage in particle necking at the neck regions 132. Joule heating may, for example, be utilized in embodiments where other heating methods (i.e., laser, RF, microwave) cannot penetrate to the location of the nano-particle layer.

In some embodiments, a heater electrode may also be provided on the top substrate. As having heaters on both surfaces may improve heating and potentially speed the sintering process. As the mediums are generally poor conductors, it may be hard to run a current through the nano-particle medium from a top electrode to a bottom electrode to enable Joule heating of the nano-particle layer. Therefore, in some embodiments, the nano-particle layer may be printed so that it spans the gap between two adjacent traces or pads on the same substrate.

In some embodiments, a reflow oven may be used to heat the nano-particle layer. A commercial reflow oven may be used to sinter nano-particle layers. When using a reflow oven, the substrates (e.g., the optical fibers) may be held in position, such as via clamping fixtures, clips or similar means.

The methods of heating discussed above may allow the nano-particles to fuse together at contact points of adjacent nano-particles. Heating the nano-particles until partial sintering occurs provides low shrinkage and a lower strength bond compared to fully sintering which provides moderate shrinkage and a high strength bond.

Although partial sintering, as discussed herein, provides a low shrinkage bond, the bond does not have as high of shear strength as a fully sintered bond. In some embodiments, an adhesive may be added after the nano-particles are partially sintered to provide a low shrinkage and high strength bond. FIG. 5B shows a partially sintered nano-particle layer 130 filled with an adhesive 170. When nano-particles are initially joined, interstitial voids between the nano-particles are connected to one another, forming an open porous network throughout the joining layer 130. As such, the shear strength of the bond may be lower than desired. In some embodiments, to increase the shear strength, an adhesive may be used to backfill the interstitial voids. Although, as discussed above, adhesives have a tendency to shrink in volume as they cure, when an adhesive is applied about a joined nano-particle layer, the nano-particle layer resists the shrinkage of the adhesive, resulting in a stronger bond with shape retention. In some embodiments, the adhesive may be a low viscosity thermal cure adhesive, such as Epo-tek 353ND.

Figure 6B:
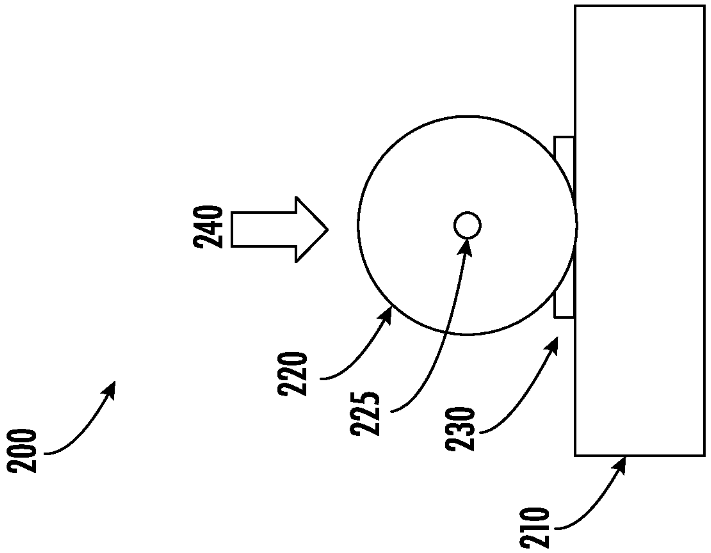
FIG. 6A-6D illustrate various steps of an example fusion between two substrates using nano-particles, in accordance with some embodiments discussed herein.
Figure 6A:
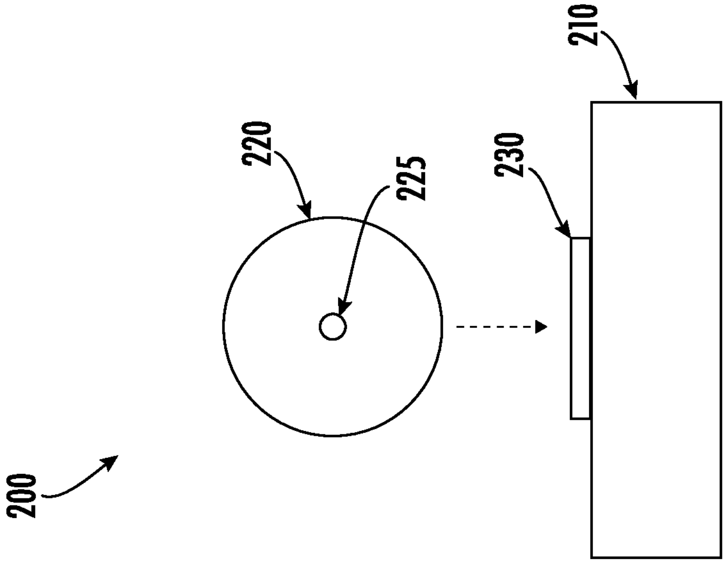

FIGS. 6A-D illustrate an example assembly 200 of substrates joined together using nano-particle joining as discussed above. FIG. 6A shows an assembly 200 having a layer of nano-particle 230 applied to a first substrate 210. Before application with one of the methods as discussed above (e.g., ink or laser printing), the nano-particles are prepared as discussed above (e.g., suspended in a medium). In some embodiments, the layer of nano-particles on substrate 210 may then be exposed to a thermal process (e.g., an oven) to reduce the medium and expose the nano-particles, such that the nano-particles are in contact with each other and the first substrate 210 providing a more rigid layer of nano-particles.

Once the nano-particles are prepared, the second substrate 220 (e.g., a fiber including a core 225) may be added. The prepared nano-particles (e.g., nano-particles suspended in a medium which is exposed to a thermal process) may provide a rigid layer for the second substrate 220 to be aligned on, such that the rigid layer of nano-particles is not displaced during application. FIG. 6B illustrates a second substrate 220 lowered from its initial position onto the nano-particle layer 230 into alignment with the first substrate 210. In other example embodiments, as the second substrate 220 is lowered onto the first substrate 210 it contacts the layer of nano-particles on substrate 210. If the layer of nano-particles on substrate 210 was not previously exposed to a thermal process, the nano-particle layer 230 may be laterally displaced, forming a narrow gap between the second substrate 220 and the first substrate 210 in the region that neighbors the contact point of the substrates. The nano-particle layer 230 consists of particles much smaller than 1 um in diameter (e.g., 30-70 nm). Therefore, any remaining particles trapped in the gap between the first substrate 210 and the second substrate 220 do not introduce an unwanted vertical shift, offsetting the second substrate 220, such as upon full sintering.

Figure 6D:
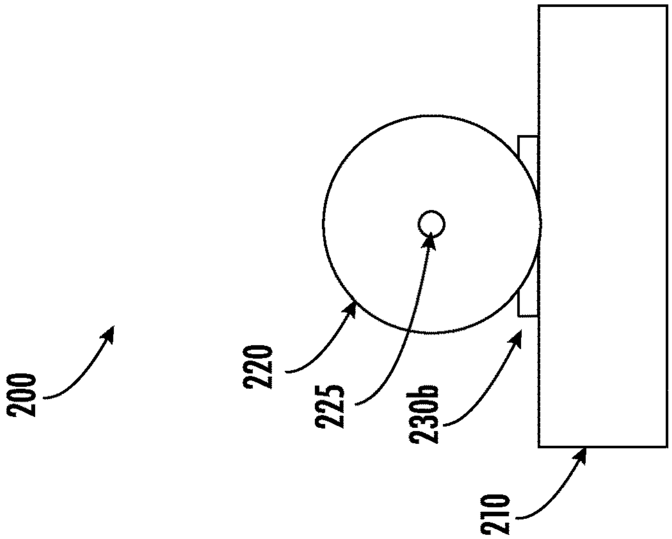
Figure 6C:
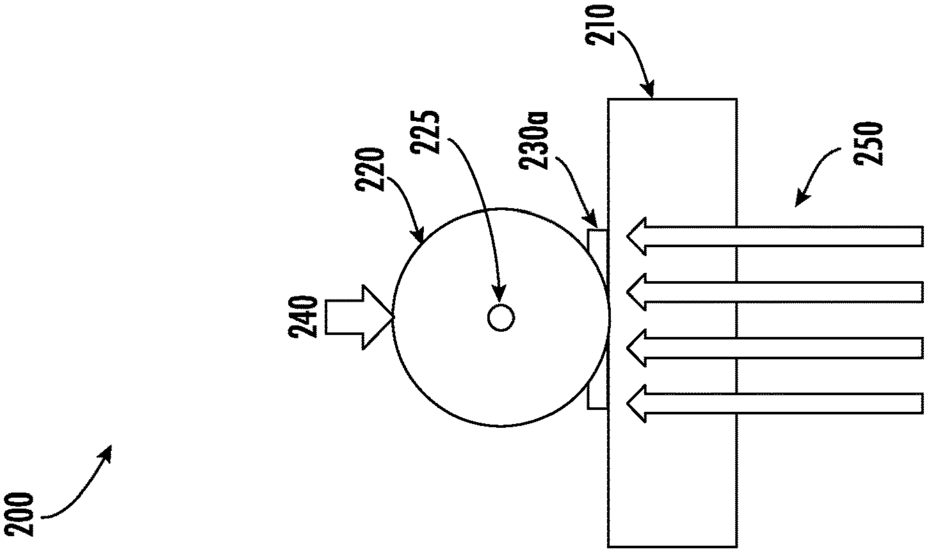

After application of the second substrate 220, pressure may be used to keep it in place while the nano-parties are heated. FIG. 6C shows that as a downward force 240 is applied to the second substrate 220 (holding it in contact with the glass substrate 210), a laser 250 is directed at the nano-particle layer 230 to cause the nano-particles to fuse together, as discussed above. The laser light 250 may be directed onto the nano-particle layer 230 from above the second substrate 220 or below the first substrate 210. In some embodiments, the laser heats the layer of nano-particles 230 up to 200° C. for a few seconds (e.g., 1-5 seconds). In some embodiments, the nano-particles may be heated between 150° C.-300° C., 175° C.-275° C., or 150° C.-250° C. In some embodiments, the laser may heat the layer of nano-particles for up to 10 seconds, up to 5 seconds, up to 3 seconds, up to 2 seconds, or up to 1 second.

After partial sintering, the first substrate 210 and the second substrate 220 are mechanically joined by the fused nano-particles. FIG. 6D illustrates the assembly 200 with the first substrate 210 and the second substrate 210 joined via the partially sintered nano-particle layer 230*b*. Although, not shown, in some embodiments, the layer of nano-particles may include a filler material and/or an adhesive may be applied about the sintered layer of nano-particles.

In some embodiments, after the first substrate 210 and second substrate 220 are joined by the nano-particle layer, the substrates may remain precisely aligned after solder reflow, or environmental testing. In some embodiments, the alignment of the first and second substrate may change less than 0.5 um, less than 0.2 um, less than 0.1 um, or less than 0.05 um upon introducing the assembly 200 to a solder reflow oven.

Figure 7A:
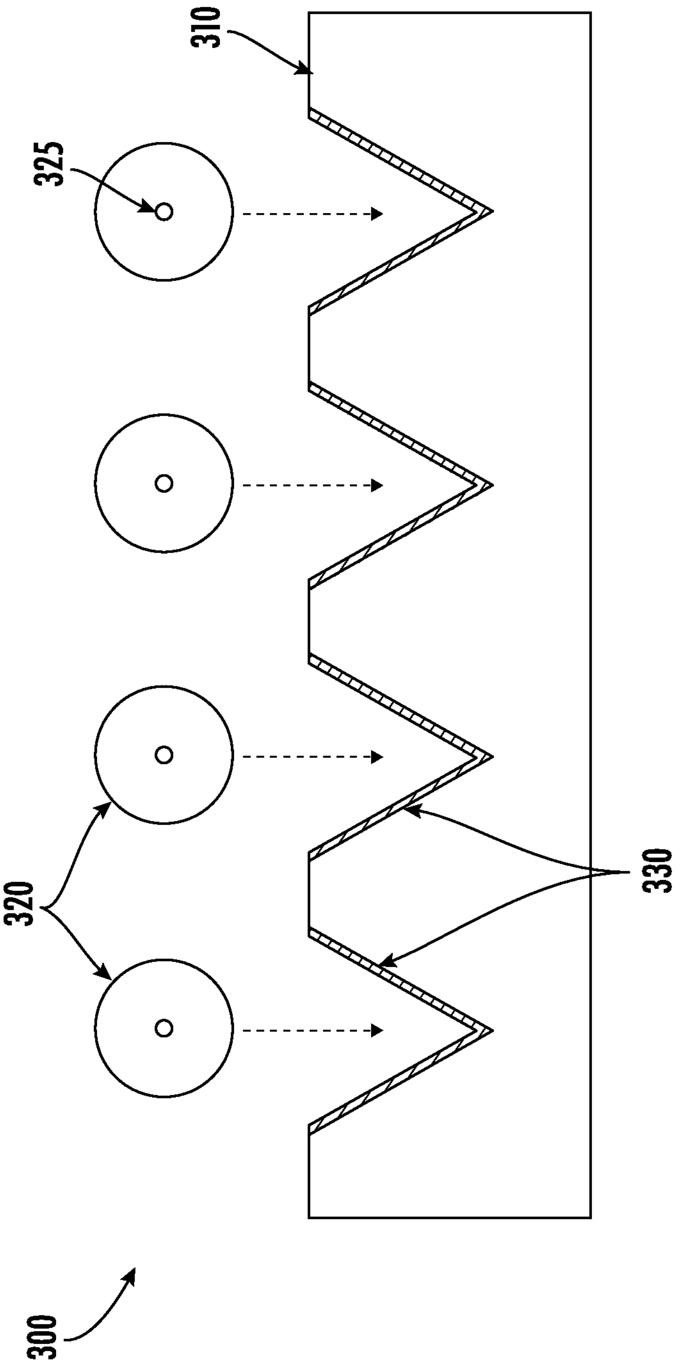
FIGS. 7A-7D illustrate various steps of fusing substrates using nano-particles, in accordance with some embodiments discussed herein.

In some embodiments, fibers may be attached to a V-grooved substrate to create a V-grooved fiber array unit (FAU). FIG. 7A illustrates an example first step in the assembly of a fiber array unit 300. A thin layer of nano-particles 330 (e.g. <1 um thick) is prepared, (e.g., suspended in a medium) and applied to each sidewall of the V-groove substrate 310. In some embodiments, the V-grooved substrate may be a V-groove chip. The layer of nano-particles 330 is exposed to a thermal process to reduce the medium and facilitate contact between adjacent nano-particles. An array of optical fibers 320 is aligned over the V-grooves and lowered onto the layer of nano-particles 330. The V-grooves of the substrate 310 may be fabricated with a precise pitch, such that when the array of fibers 320 are attached to the V-grooves of the substrate 310 the cores 325 of the array of fibers 320 are aligned along the precise pitch.

Figure 7B:
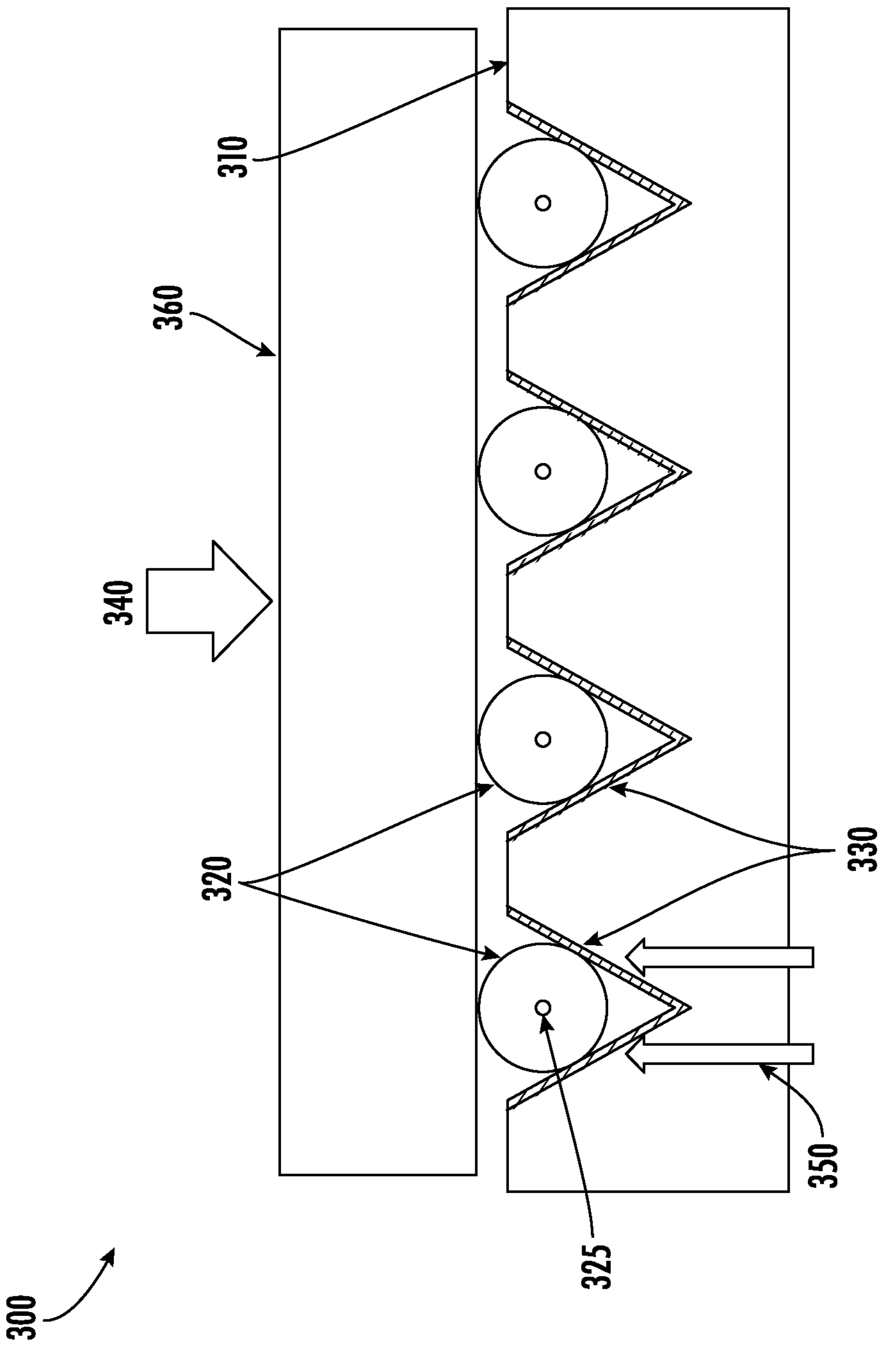
Figure 7C:
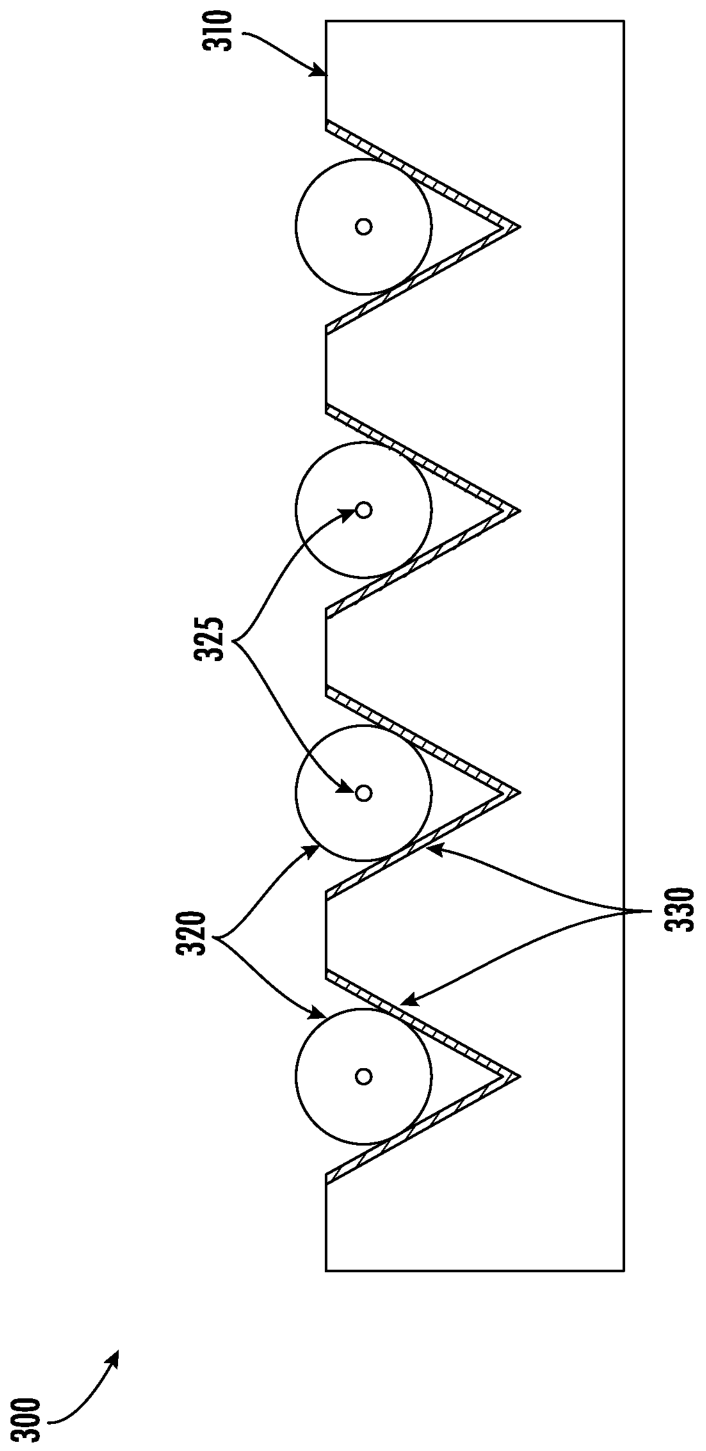

Once the fibers are aligned in the V-grooves, pressure may be applied to ensure that when the fibers are fused, they are aligned with the precise pitch. FIG. 7B shows a pressure substrate 360 positioned over the fiber array 320. The pressure substrate 360 applies force 340 to the fiber array 320 to push the fiber array down into contact with the V-grooves of the substrate 310. While the force is applied, the layer of nano-particles 330 is heated using one of the heating methods described above, such as laser heating 350. Although laser heating is shown passing through the V-groove substrate 310, the laser heating may also be directed down through the fiber array 320 from the top, or through the pressure substrate 360. In some embodiments, the beam direction, shape, and focus location may need to be adjusted to enable localized heating where the optical fiber 320 contacts the nano-particle coated V-groove sidewall. In embodiments utilizing laser heating, the substrate may be optically transparent at the laser wavelength, such as at 800 nm or 1064 nm. FIG. 7C illustrates the assembly 300 with the fiber array 320 bonded to the V-groove substrate 310 by a layer of fused nano-particles 330. An adhesive may also be applied over optical fibers 320 and/or under the optical fibers 320 in V-grooves of the substrate 310.

A lid or cover may be added to the V-groove FAU to provide protection for the fibers.

Figure 7D:
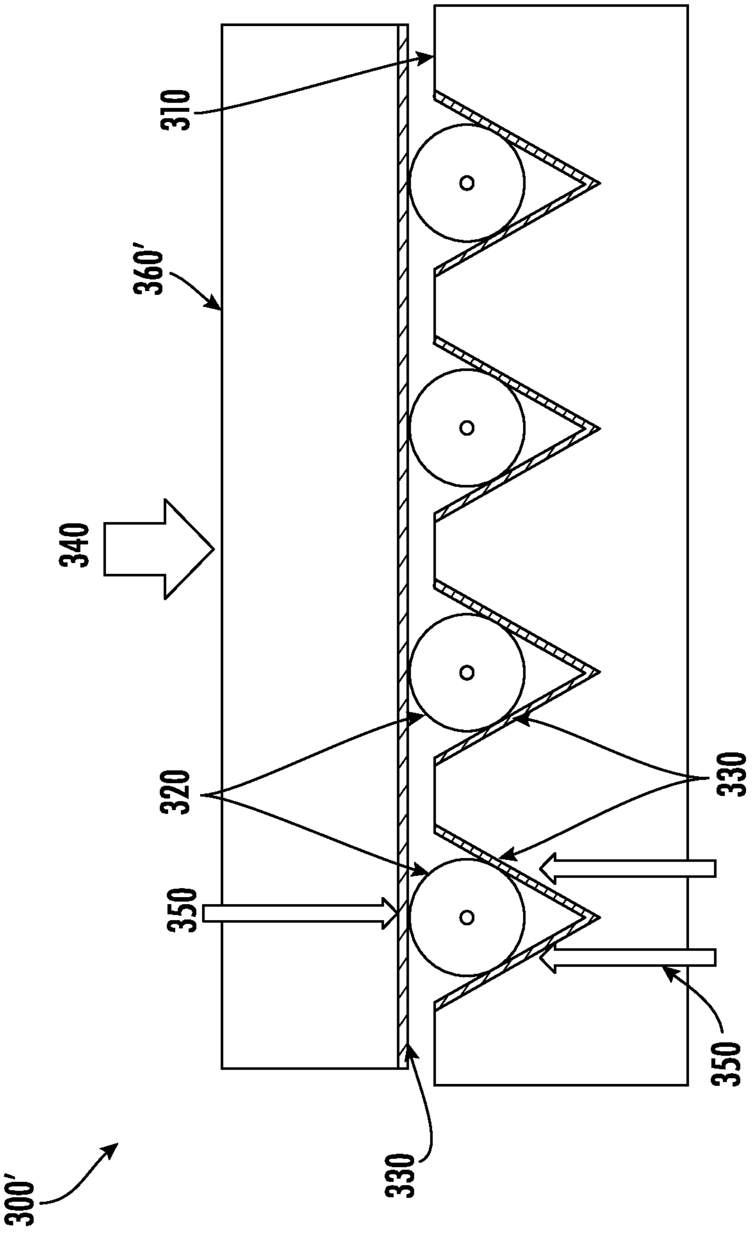

FIG. 7D illustrates a lidded fiber array unit 300'. In some embodiments the pressure substrate, may be a glass lid 360'. A bottom surface of the lid 360' may be coated with a second layer of nano-particles 330. While the glass lid presses on the fiber array 320, laser heating may be directed towards multiple points, for example, where the fiber array contacts the V-grooved substrate 310, and where the fiber array contacts the lid 360'. As described above, laser heating may be directed from a single side (either the top or the bottom) if the nano-particle layer is only applied to selective areas of the lid and/or the V-grooved sidewalls. In embodiments where the layer of nano-particles is not across the entire surface (e.g., the nano-particles are only in locations where the fiber array will contact) the laser energy may pass through the uncoated portions of the assembly, such that the energy reaches both layers of nano-particles (e.g., on the lid and within the V-groove sidewalls).

After the FAU is manufactured, an adhesive may be added to increase the strength of the bonds. In some embodiments, the cavities between the lid 360' and the V-groove substrate 310 may be filled with an adhesive. The adhesive may be UV curable, an organic adhesive, or an inorganic adhesive. The adhesive is preferably selected to have a lower elastic modulus, to limit the upward force on the fiber array during heating, or a low-expansion filler material may be added to reduce the CTE of the joint to better align with the CTE of the surrounding glass V-grove materials. The adhesive may have a low viscosity (e.g., –1 cP) to allow the adhesive to flow into small cavities within the FAU via capillary force.

Although the materials herein have been described as being a glass substrate, a fiber array, and a glass lid, it should be understood that any appropriate substrates may be used. For example, the substrates may be silicon based, metallic, or ceramic materials.

Figure 8A:
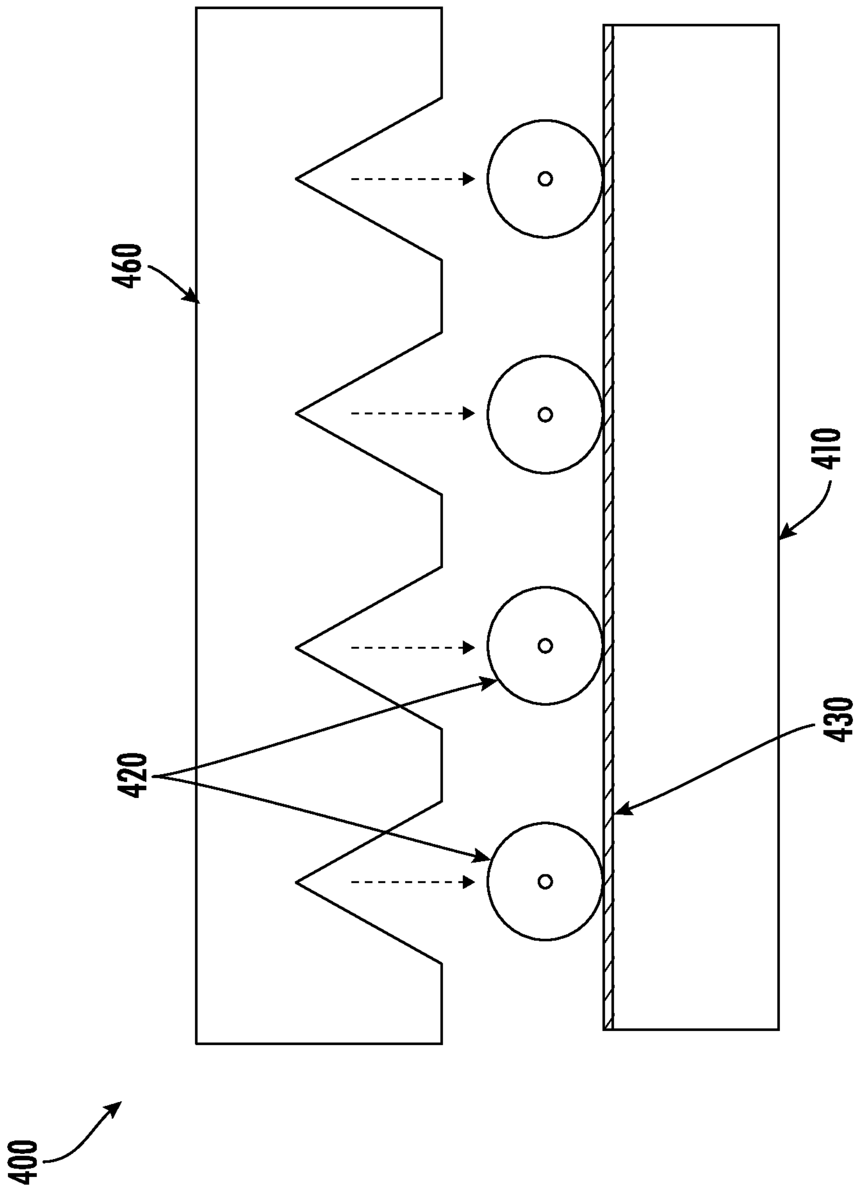
FIGS. 8A-8B illustrate a V-grove substrate used to align two substrates for joining via nano-particles, in accordance with some embodiments discussed herein.
Figure 8B:
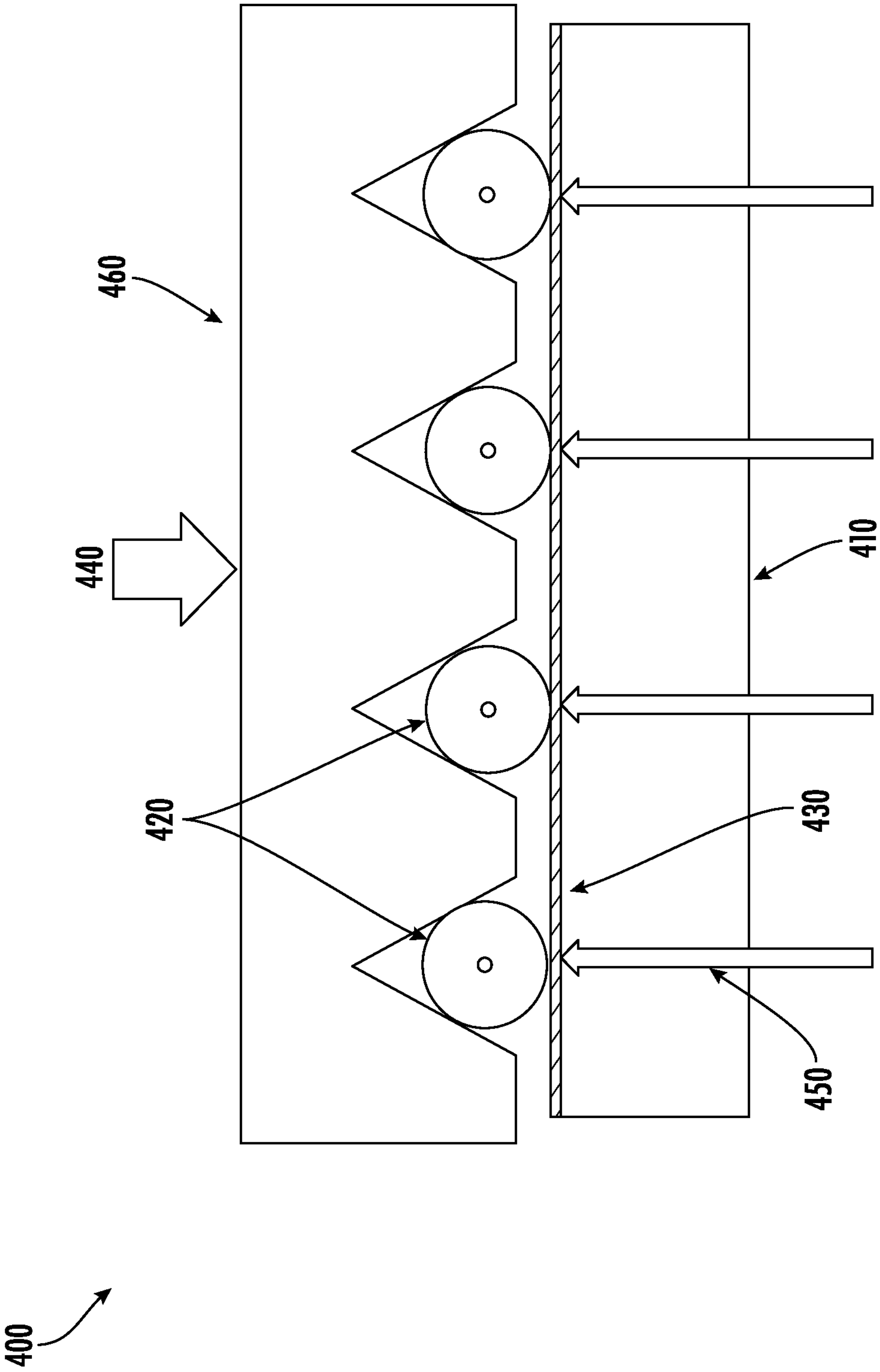

Nano-particle joining may be used to attach a fiber to a flat substrate such that the fibers are spaced apart from one another (e.g., in a desired alignment). In some embodiments where a substrate with a circular cross-section (e.g., a fiber) is attached to a flat surface, the substrates may be aligned using an alignment substrate, to facilitate precision attachment. FIGS. 8A-8B illustrate example process steps for fiber attachment to a flat substrate, specifically V-groove alignment of an array of fibers to a glass substrate. FIG. 8A illustrates a first step in alignment and attachment of optical fibers 420 onto a base substrate 410. The nano-particles are prepared and deposited on a layer of nano-particles 430 on the first substrate 410 using one of the deposition processes discussed above, and exposed to a first thermal process. In some embodiments, as illustrated in FIG. 8A, the layer of nano-particles 430 may be applied across the entirety of the base substrate 410, while in other embodiments, the layer of nano-particles may be deposited only in the regions where the optical fibers contact the base substrate. Notably, such local deposits may enable sintering processes that are localized to specific regions, such as microwave heating, or bulk illumination where strong optical absorption only occurs in regions coated with nano-particles.

The alignment structure may also provide a downward force to facilitate contact between the substrates before sintering the nano-particles. Referring to FIG. 8B, an alignment structure 460 may be positioned over the optical fibers 420 and lowered until the alignment structure 460 contacts the optical fibers 430 and applies a downward force 440. A heating process 450, (i.e., laser heating) is applied to each of the optical fibers 420 to sinter the layer of nano-particles 430—effectively joining the optical fibers 420 and the base substrate 410. After the optical fibers 420 are joined to the base substrate 410, the alignment substrate 460 may be removed.

Figure 9:
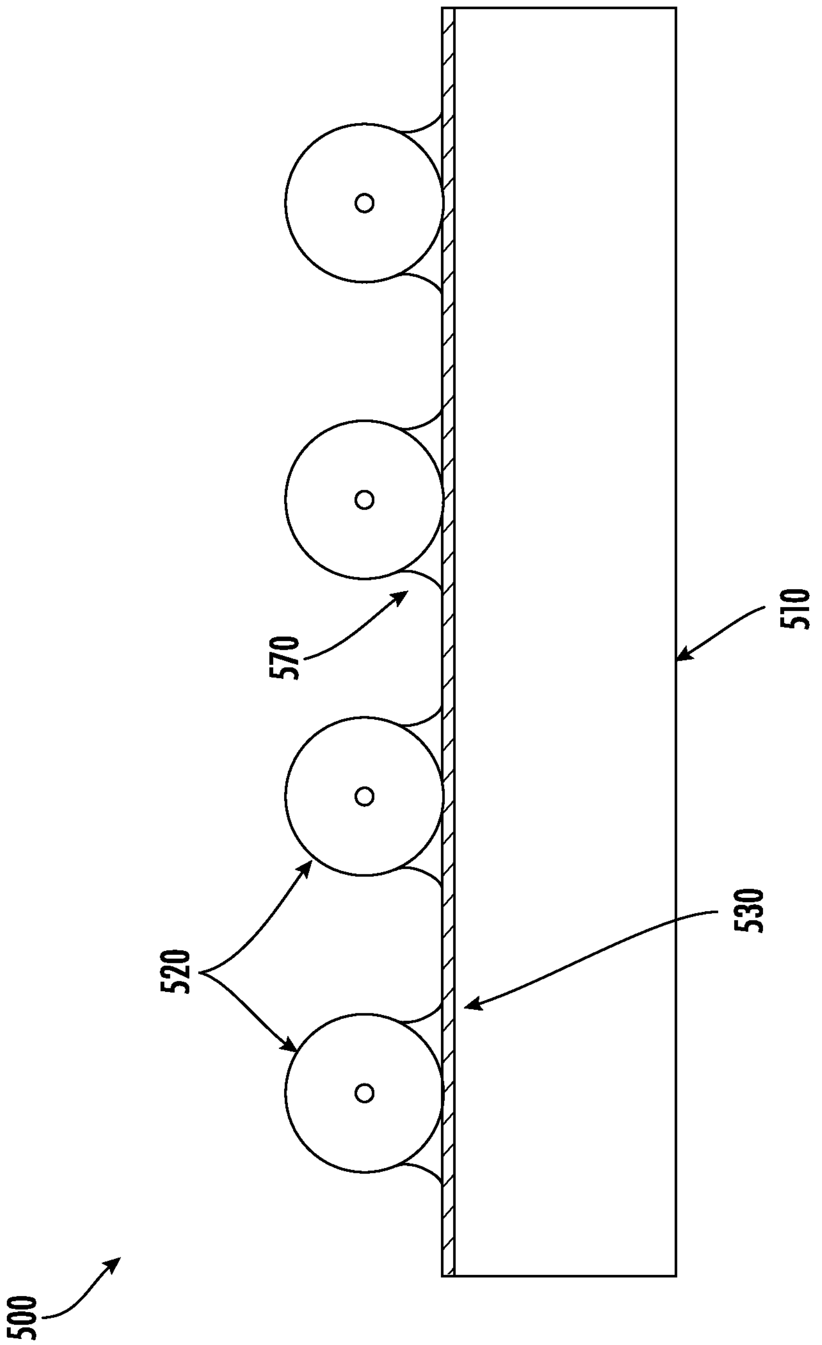
FIG. 9 illustrates a cross-sectional view of substrates joined using nano-particles with an adhesive applied to the region where the substrates are in contact, in accordance with some embodiments discussed herein.

An adhesive may be applied about the sintered nano-particle to increase the strength of the bond. FIG. 9 shows a fiber array 500 resulting from the process described with reference to FIGS. 8A-8B. The fiber array 500 includes an adhesive 570 about the contact location of optical fiber 520 and the base substrate 510. In some embodiments, the adhesive may be an organic adhesive (e.g., UV curable adhesive), or an inorganic adhesive (e.g., sodium silicate).

Figure 10A:
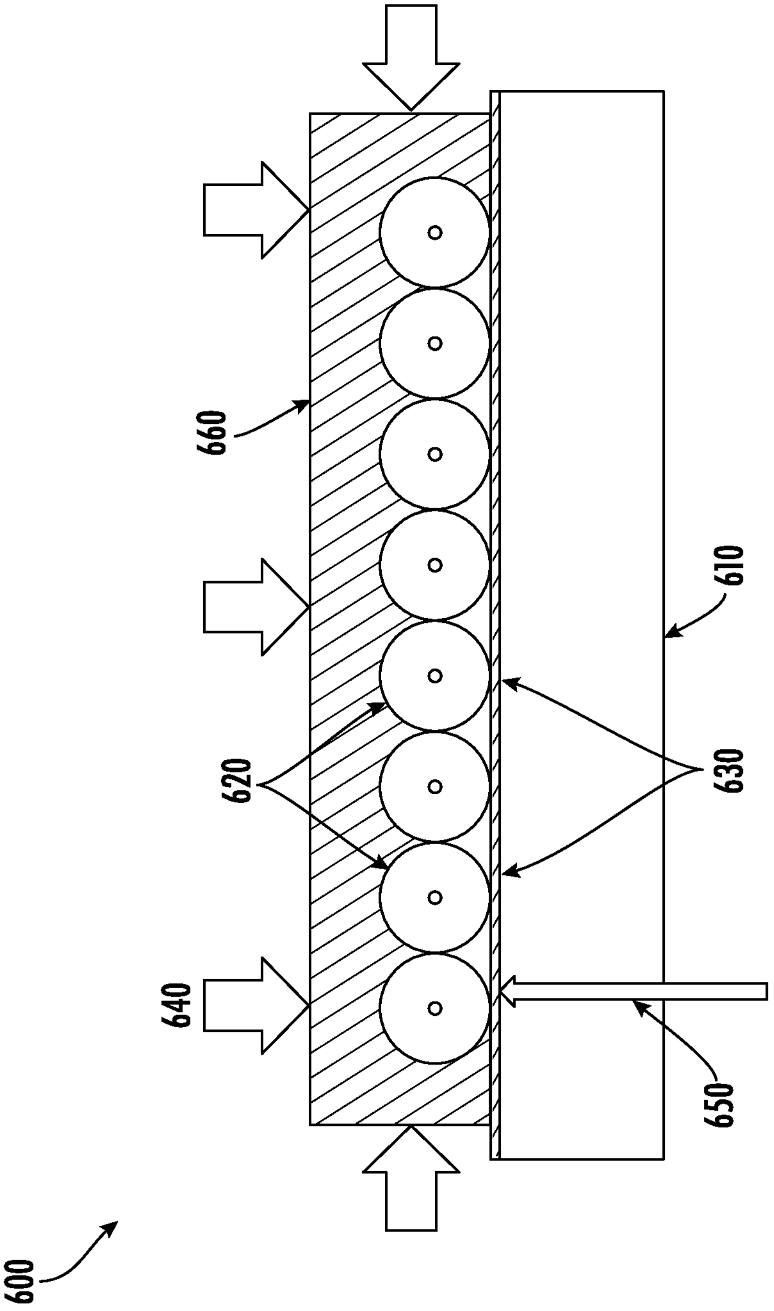
FIGS. 10A-10B illustrate a cross sectional view of a squeeze apparatus to apply a force to the substrates during nano-particle joining, in accordance with some embodiments discussed herein.
Figure 10B:
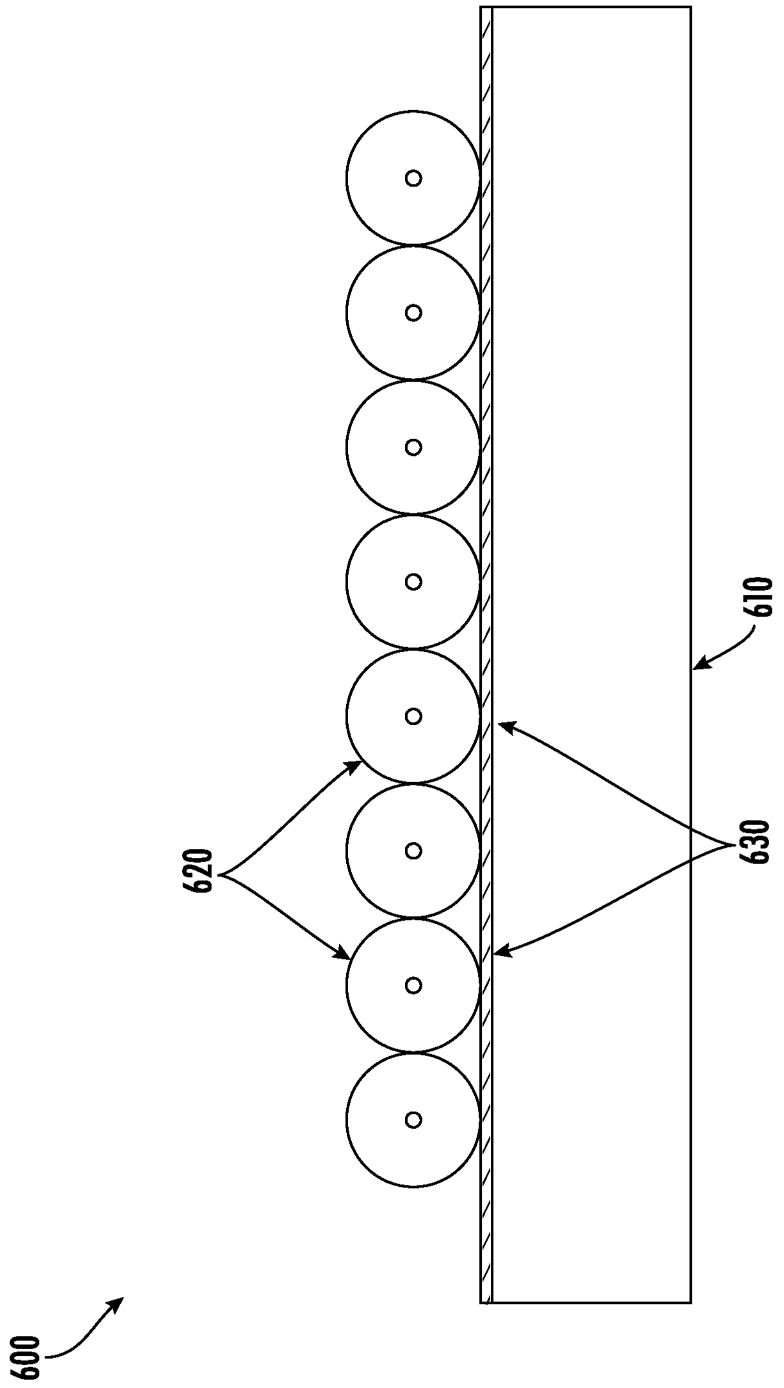

Nano-particle joining may be used to attach a fiber to a flat substrate such that the fibers are abutting one another. FIGS. 10A-10B illustrate an example embodiment of a squeeze alignment mechanism. FIG. 10A shows a base substrate 610 with a thin layer of prepared nano-particles 630 applied. Multiple optical fibers 620 (e.g., a fiber array) is applied to the layer of nano-particles 630, such that the optical fibers 620 are in contact with the layer of nano-particles 630, and the other optical fibers 620. A squeeze pad 660 may be used to hold the optical fibers 620 in alignment on the base substrate 610, and in alignment with the other optical fibers 620. Additionally, the squeeze pad 660 may provide force 640 on the optical fibers 620, pressing the optical fibers 620 onto the first substrate 610, and towards adjacent optical fibers 620. While the squeeze pad 660 is in place, each of the optical fibers 620 is joined to the base substrate 610 by heating the layer of nano-particles 630 (e.g., laser heating from below). In some embodiments, a layer of nano-particles 630 may be applied about the optical fibers 620, to join each of the optical fibers together. FIG. 10B illustrates the fiber array 600 after the base substrate 610 and the optical fibers 620 are joined by the layer of fused nano-particles 630, and the squeeze pad 660 is removed.

Figure 11B:
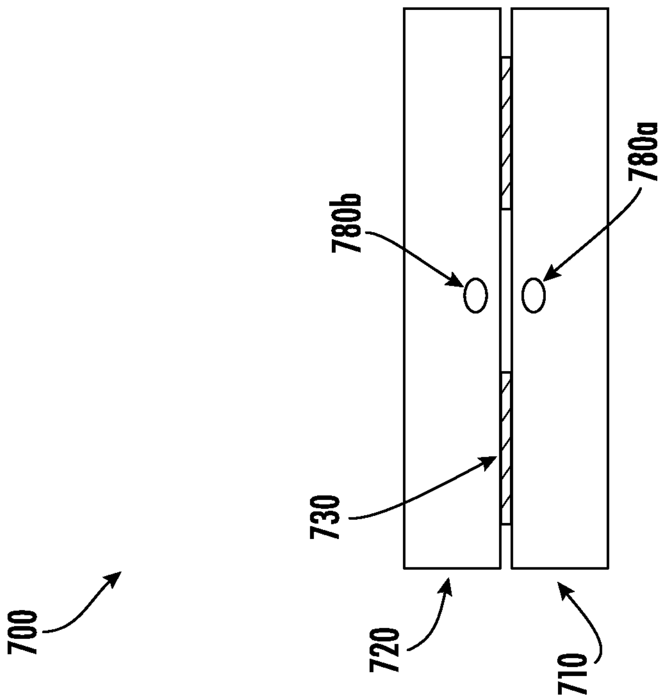
FIGS. 11A-11B illustrate a cross-sectional view of joining of two substrates for evanescent coupling, in accordance with some embodiments discussed herein.
Figure 11A:
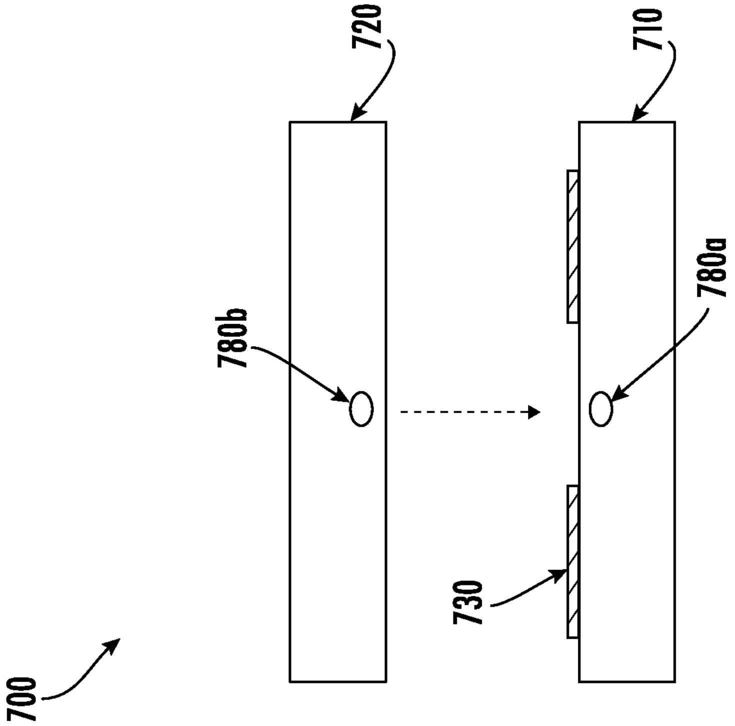

The nano-particle joining process as described herein may also be applied to attach two flat substrates. FIGS. 11A-11B illustrate a joining process that results in evanescent coupling between planar waveguides. A first planar light wave circuit (PLC) 710 has a thin (e.g., 0.1-0.5 um thick) discontinuous layer of prepared nano-particles 730 applied to the top surface wherein a gap in the layer of nano-particles allows evanescent coupling and alignment of the waveguides 780*a*, 780*b*. A second PLC substrate 720 is laterally and angularly aligned so the ion exchange waveguide 780*b* of the second PLC substrate 720 overlaps the ion exchange waveguide 780*a* (planar waveguide) of the first PLC substrate 710. After waveguide alignment, the layer of nano-particles 730 is heated, for example with laser heating, such that the first PLC substrate 710 and the second PLC substrate 720 are bonded together as illustrated in FIG. 11B. In some embodiments, the interface between the first PLC substrate 710 and the second PLC substrate 720 may be filled with an index matching adhesive. The adhesive may be chosen due to properties that improve coupling between the waveguides 780*a*, 780*b*.

The FAU's as described above may be coupled with a PLC substrate including a planar waveguide to provide a strong mechanical connection, with a low profile. FIGS. 12A-12F illustrate joining a V-groove substrate (shown from the side), designed for end face coupling, to PLC waveguides.

Figure 12A:
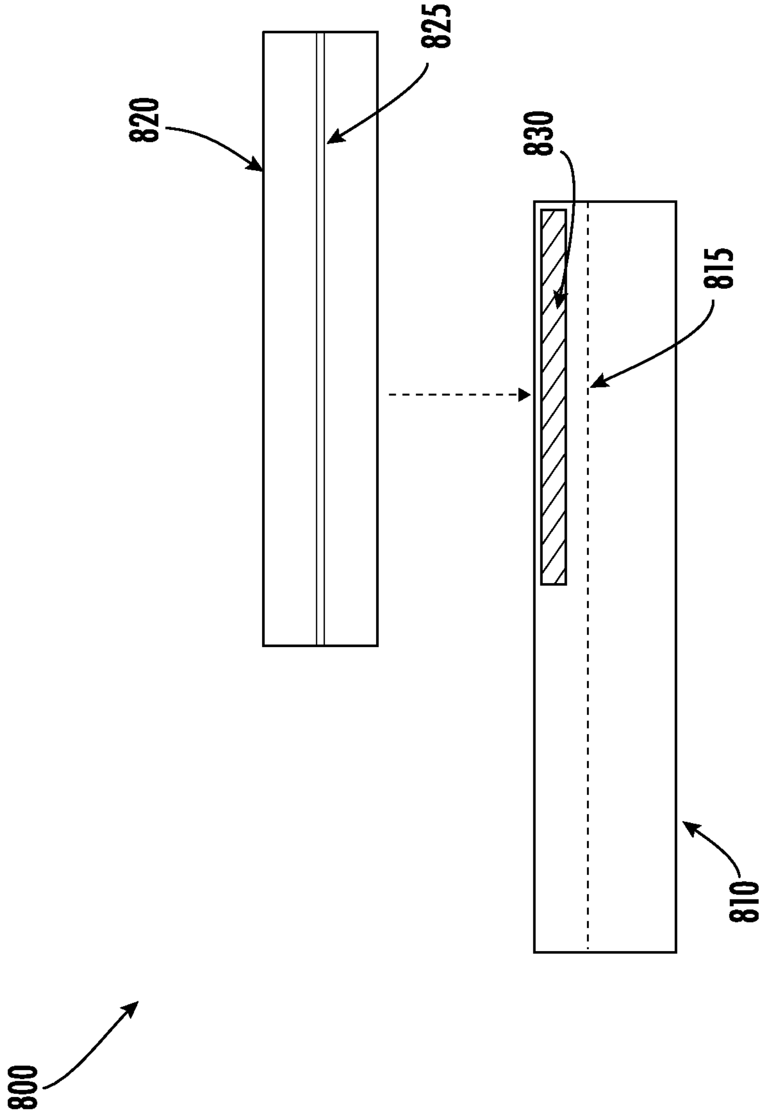
FIGS. 12A-12F illustrate a side-view of joining substrates in a V-groove based fiber array unit interconnection to a planar light wave circuit (PLC) waveguide using nano-particles, in accordance with some embodiments discussed herein.
Figure 12B:
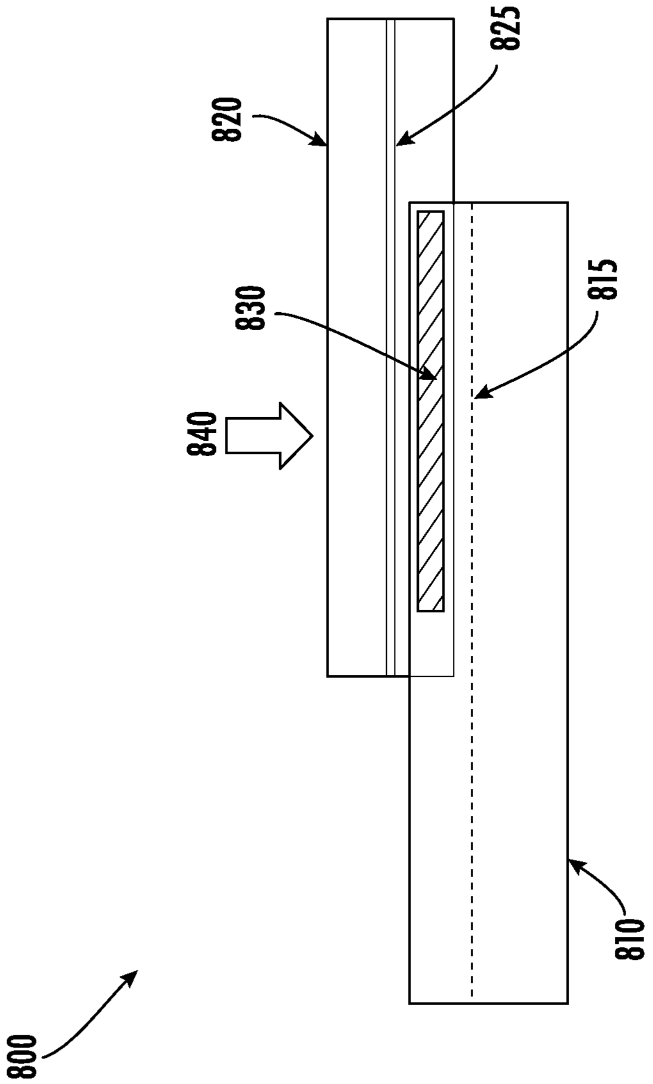

An FAU may be made according to the methods as discussed above with reference to FIG. 7. FIG. 12A illustrates an explanatory side view, of the first step of making a waveguide with a V-grooved fiber array unit (e.g., the assembly 300 of FIG. 7). A layer of prepared nano-particles 830 is applied to the V-groove side walls of the V-groove substrate 810 (e.g., the V-grooves of FIG. 7A). The bottom 815 of the V-groove is illustrated as a dotted line. An optical fiber 820 is aligned over the V-groove of the substrate 810. FIG. 12B illustrates a side view of FIG. 7C, wherein the optical fiber 820 is placed in the V-groove of the substrate 810, and a force 840 is applied to the optical fiber 820 while the layer of nano-particles 830 is heated, for example, by laser heating.

Figure 12C:
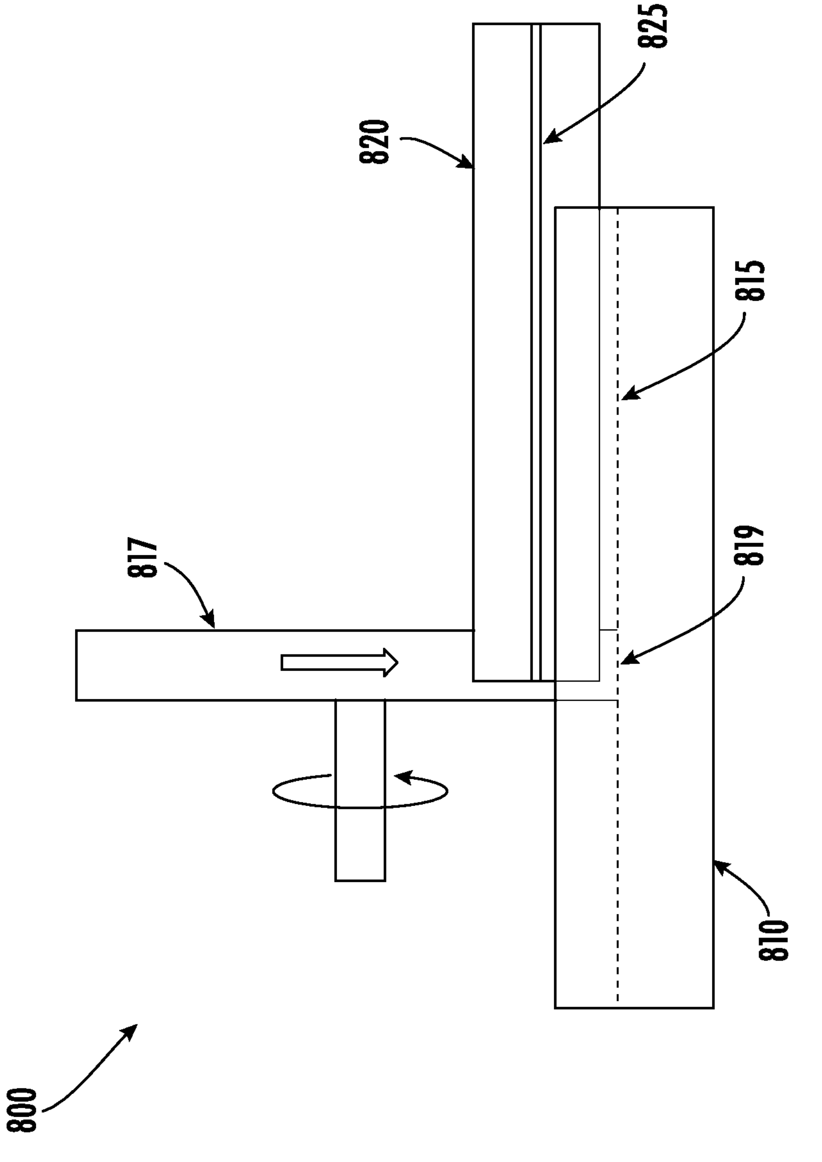
Figure 12D:
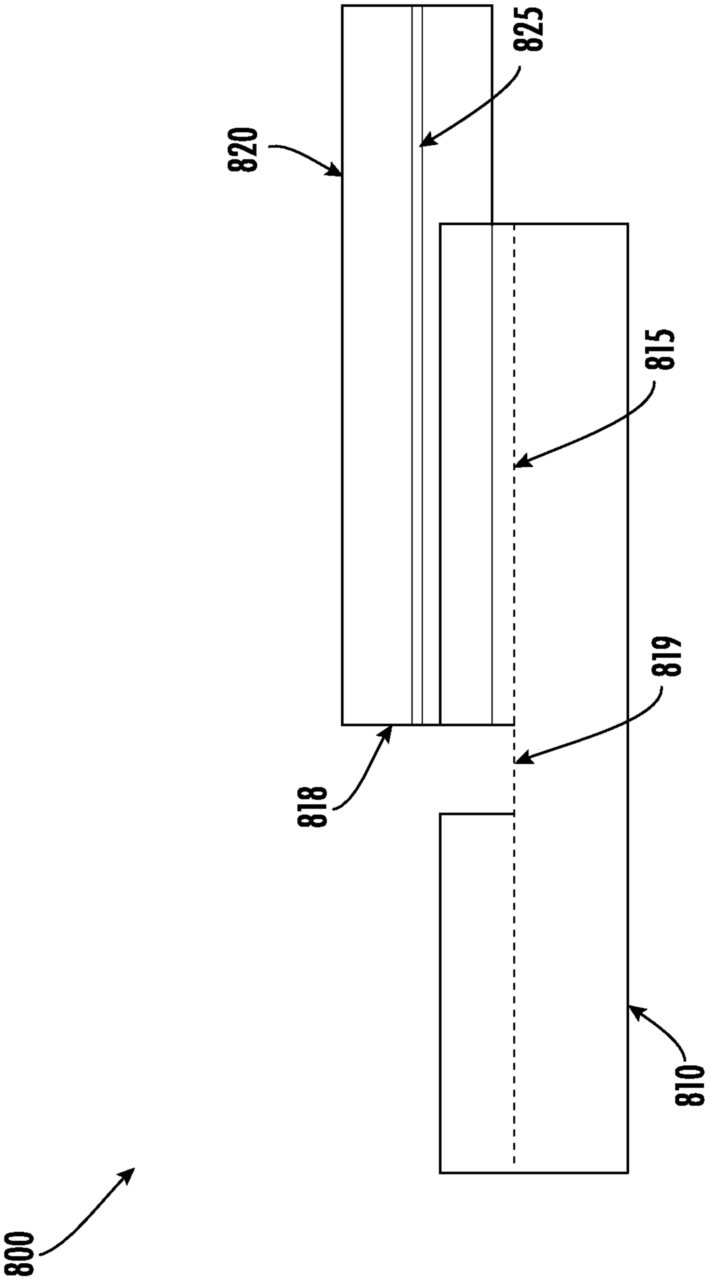

The ends of the fibers attached to the substrate may not be the same length. In order to create precision alignment, the fibers may be cut to all be the same length. Accordingly, in some embodiments, the V-groove substrate may include notches where the ends were cut. FIG. 12C shows a side view of a saw 817 (e.g., a dicing saw) sawing the ends of optical fibers 820, so that the optical fibers 820 are all the same length. The saw 817 may create a shallow notch 819 in the V-grove substrate 810. FIG. 12D illustrates the cleaved ends 818 of optical fibers 820 and sawed notch 819 which are ready to be coupled to a PLC waveguide for low losses. In some embodiments, the optical fibers 820 may be cleaved prior to insertion into the V-grooves using, for example, a laser cleaving process.

Figure 12E:
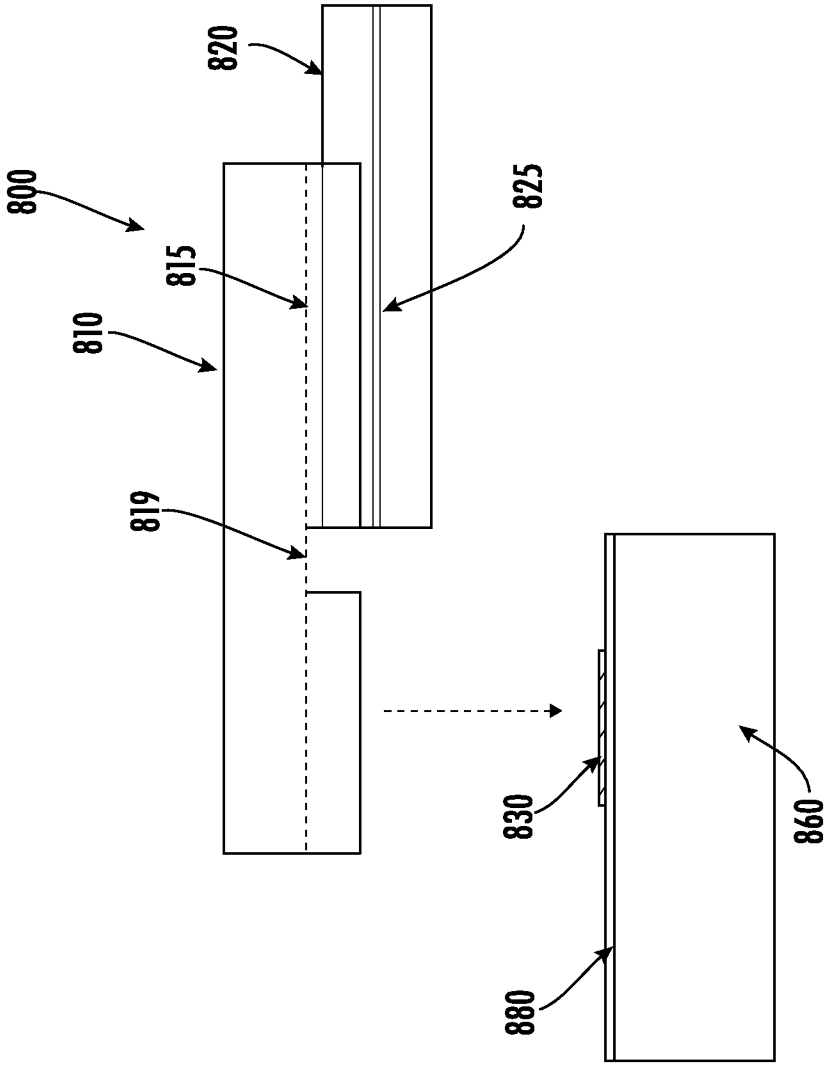

Once the fibers are all the same length, the FAU is oriented for application to a waveguide. FIG. 12E illustrates a side view of the V-grooved based FAU 800 prior to attachment with a PLC substrate 860. The FAU 800 of FIG. 12D is rotated 180 degrees (e.g., turned upside down). A layer of nano-particles 830 is placed on the PLC substrate 860. In some embodiments, the layer of prepared nano-particles may be deposited on the surface of the V-grooved substrate 810 facing the PLC substrate 860. In some embodiments, the nano-particle layer 830 may be deposited on the PLC substrate 860 such that the nano-particles 830 are not directly over the planar waveguide 880, as a way to minimize optical scattering losses out of the planar waveguide 880.

Figure 12F:
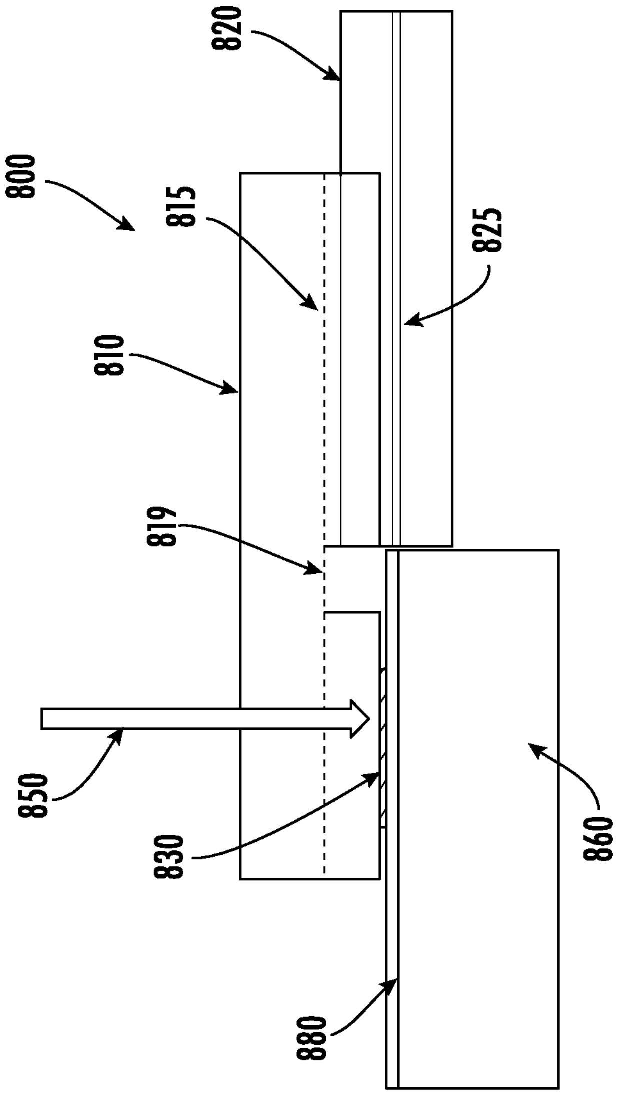

After the FAU and PLC substrate are aligned, the nano-particles may be bonded. FIG. 12F illustrates a side view of the V-grooved FAU 800 placed and aligned on the PLC substrate 860 such that the PLC planar waveguide 880 is aligned with the core 825 of the optical fiber 820. Once the waveguide 880 and core 825 are laterally and rotationally aligned, the layer of nano-particles 830 is heated, for example, using laser heating, to join the PLC substrate 860 and the V-grooved based FAU 800 together.

In some embodiments, lateral alignment of the V-grooved based FAU 800 and the PLC substrate 860 planar waveguide 880 may use passive alignment features on the PLC substrate 860. For example, raised lateral stops may be photolithographically patterned into the PLC substrate at a precise distance away from the planar waveguide. Lateral alignment may also be accomplished using a vision system, wherein Vernier marks or groups of parallel lines made on slightly different pitches on the PLC substrate surface and the V-groove FAU surface may be used to precisely align the two components prior to nano-particle joining, for example, by laser heating or sintering.

In another example embodiment, a FAU configured on a flat substrate (e.g., the assembly 400 of FIG. 8 or 600 of FIG. 10) may be interconnected to a PLC planar waveguide. FIGS. 13A-13G illustrate a side view of the process of making an FAU and using the FAU to interconnect a PLC planar waveguide.

Figure 13A:
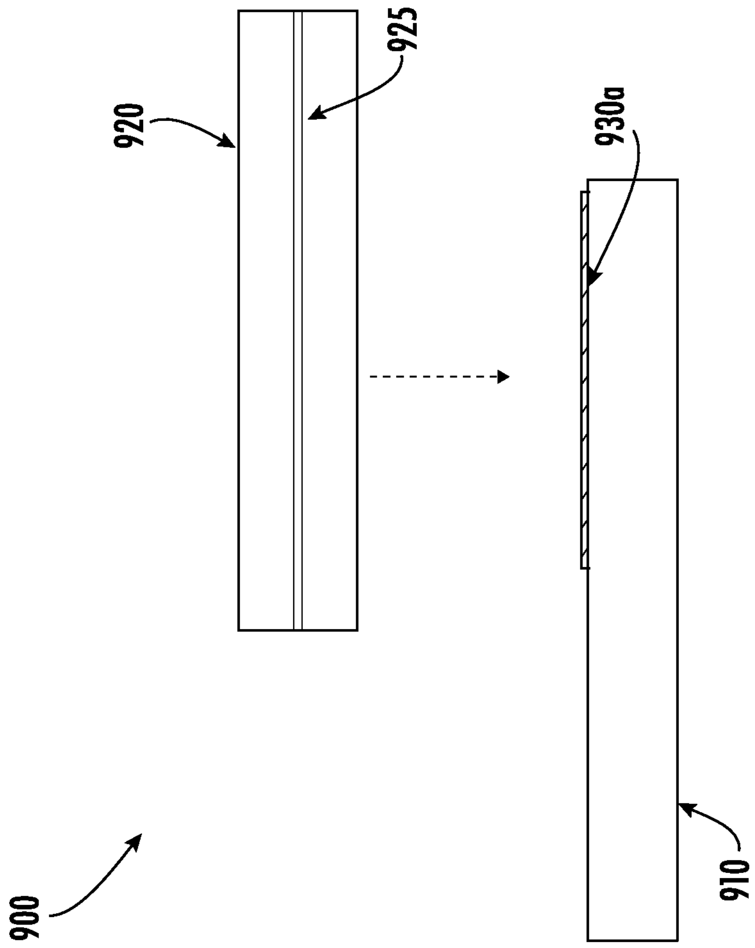
FIGS. 13A-13G illustrate a side-view of joining a fiber array-on-glass fiber array unit interconnection to PLC planar waveguide using nano-particles, in accordance with some embodiments discussed herein.

A FAU on a flat substrate may be made, for example, in accordance with the assembly of FIG. 8A-B, 9, or 10A-B. FIG. 13A illustrates a side view of an array of optical fibers 920 having a core 925 aligned with a layer of prepared nano-particles 930*a* on a base substrate 910. The optical fibers 920 may be positioned such that the fiber end faces are positioned over roughly the middle of the base substrate 910.

Figure 13B:
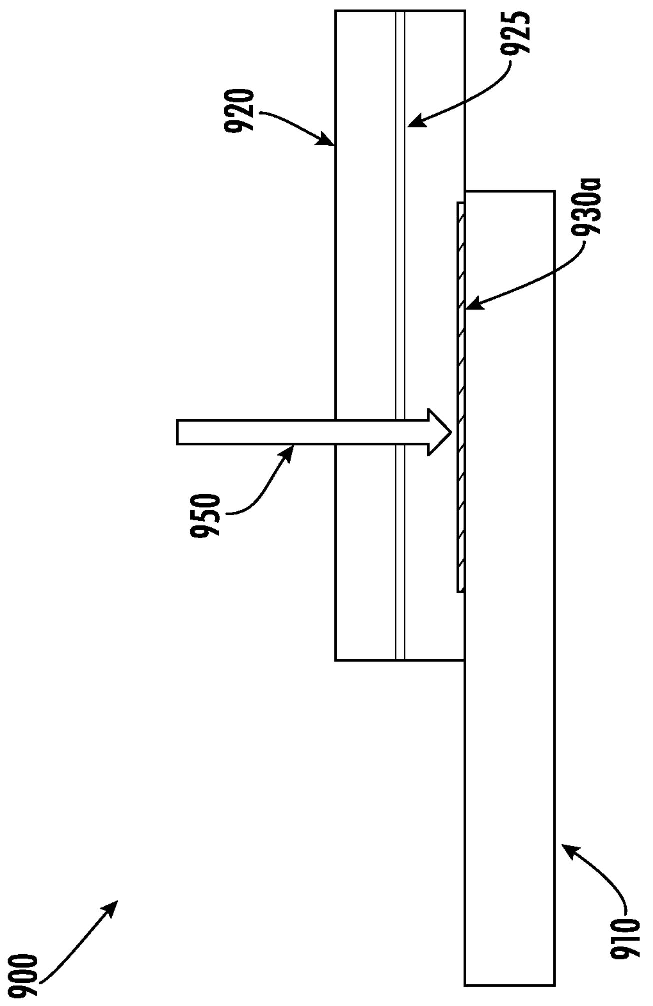

The optical fibers 920 are pressed down (e.g., with force 950) on the layer of nano-particles 930*a* (e.g., using either a V-groove alignment substrate (e.g., 460 of FIG. 8) or a squeeze pad (e.g., 660 of FIG. 10)) and heating is applied to join the fibers 920 to the base substrate 910. FIG. 13B illustrates the resulting fiber array unit 900.

Figure 13C:
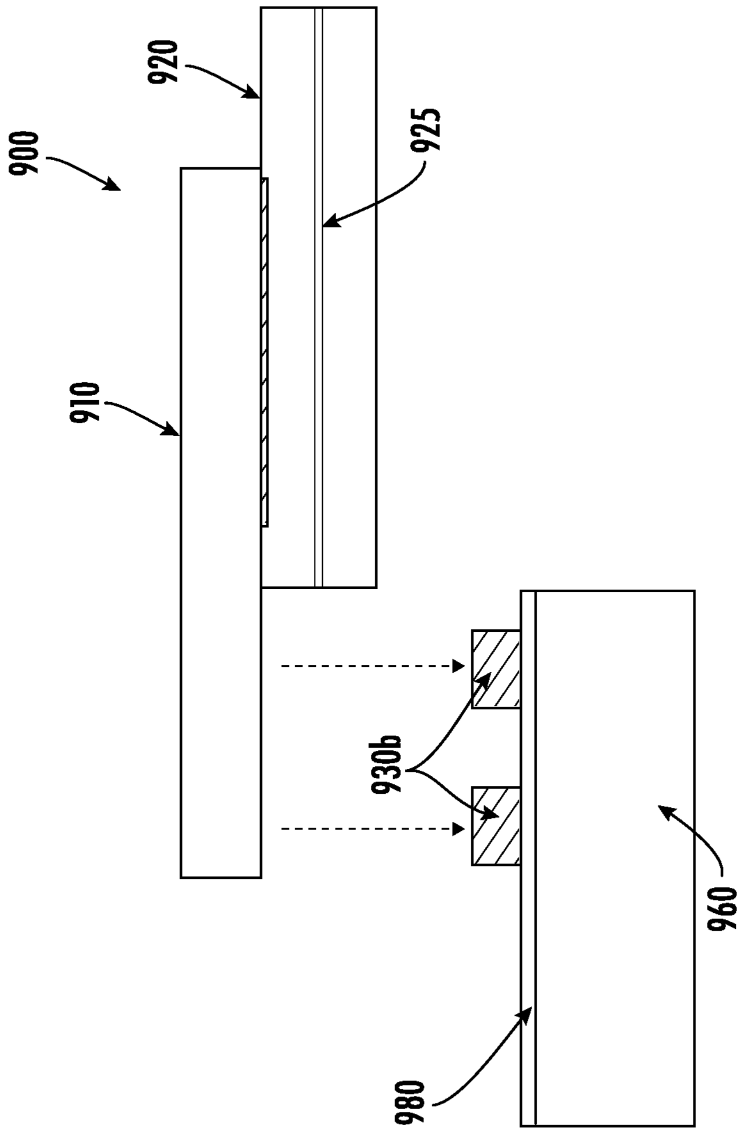

After assembly of the FAU, the FAU is orientated for joining with a PLC. FIG. 13C illustrates the first step in forming the FAU-PLC substrate bond. The FAU 900 is rotated 180° (e.g., turned upside down) and aligned with the PLC substrate 960. A thick (e.g., 5-100 um) layer of nano-particles 930*b* is applied to the PLC substrate 960 with a method as described as above, for example, with a doctor blade. The FAU 900 is lowered into contact with the thick layer of nano-particles 930*b*. In some embodiments, the thick layer of nano-particles may be greater than 10 um, greater than 20 um, greater than 50 um, or greater than 100 um thick. The layer of nano-particles may flow and deform slightly, such that the FAU optical fiber core 925 may be actively aligned, laterally and rotatably, with the planar waveguide 980 of the PLC substrate 960.

Figure 13D:
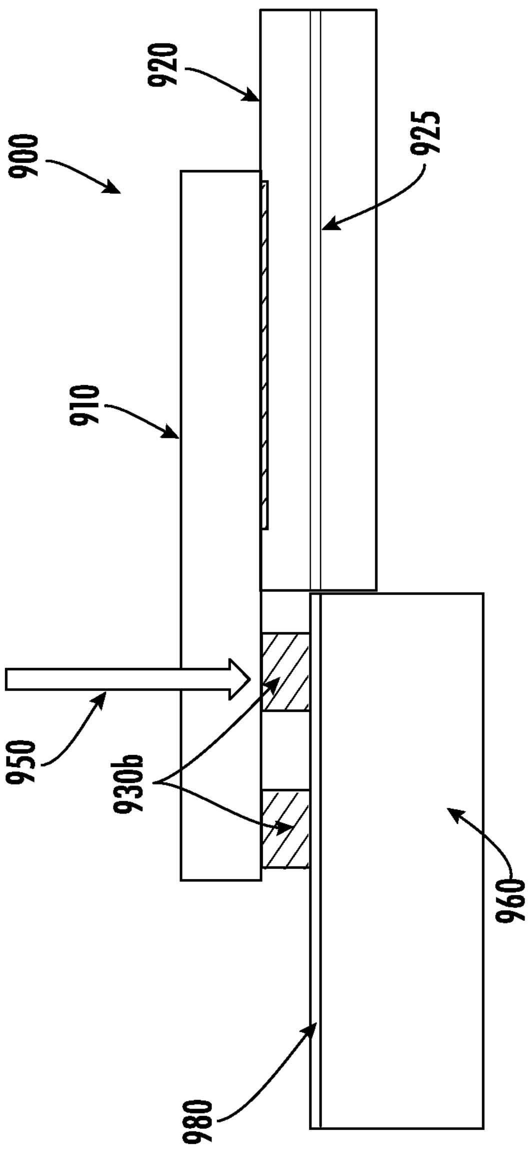

After alignment of the FAU and PLC the nano-particles may be joined. FIG. 13D illustrates heating the layer of nano-particles 930*b*, once the core 925 and the waveguide 980 are aligned, for example, with laser heating, causing the nano-particles to join together without significant reduction in dimension, as discussed above. The partial sintering of the layer of nano-particles joins the FAU 900 and the FLC substrate 960. The partially sintered thick layer of nano-particles 930*b* may accommodate a CTE mismatch with the PLC substrate 960 via small distortions of bonded nano-particles enabled by neighboring interstitial voids.

Figure 13E:
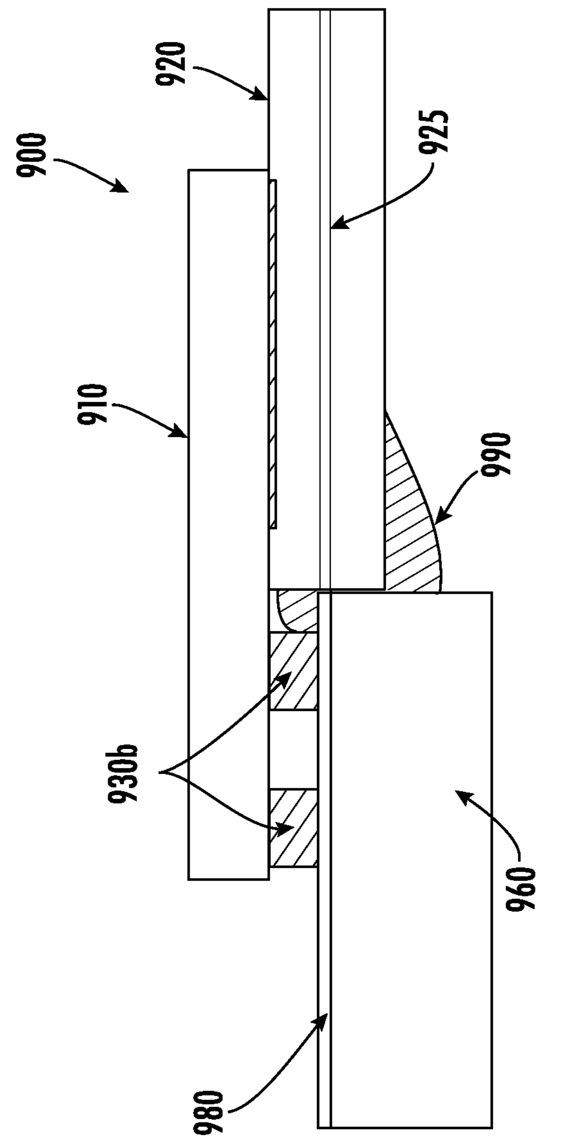

In some embodiments, as illustrated in FIG. 13E, an adhesive 990 may be added about the optical fiber 920 and the PLC substrate 960 to strengthen the bond. The adhesive may be a UV curable organic adhesive with an index to minimize back reflection at the optical fiber 920 end face. The adhesive 990 may also be applied to infiltrate voids in the partially sintered nano-particle layer 930, as discussed above, to strengthen the nano-particle bond.

Figure 13F:
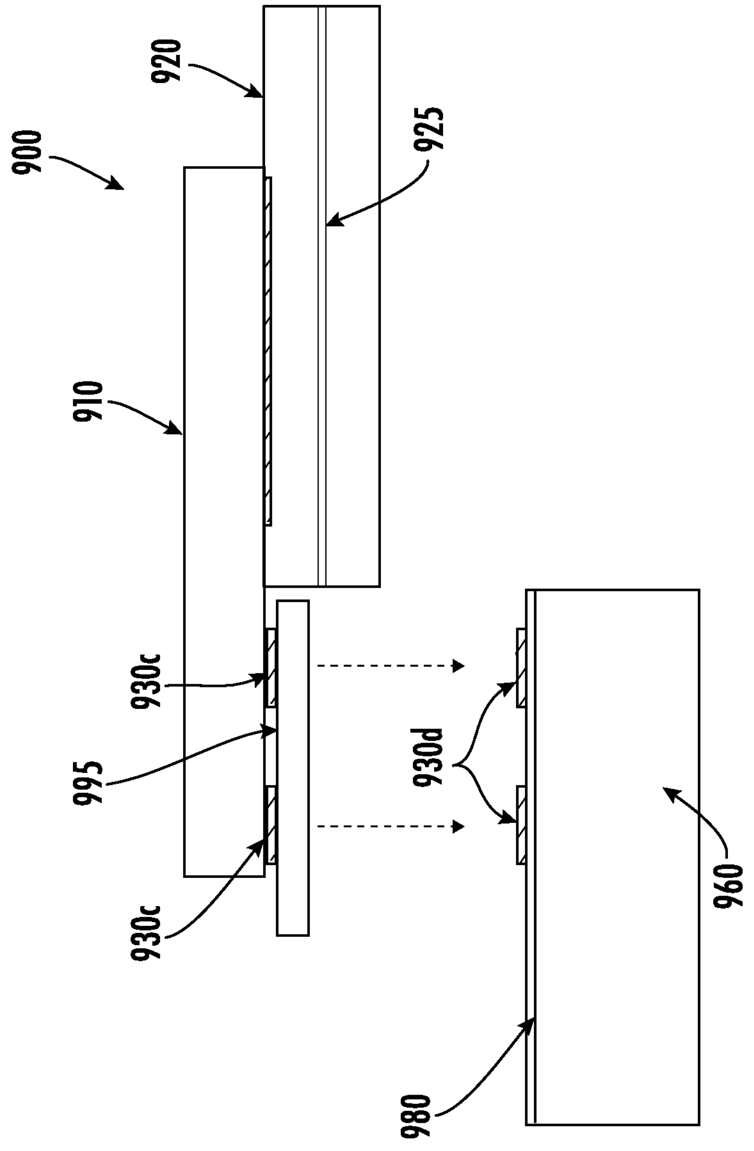
Figure 13G:
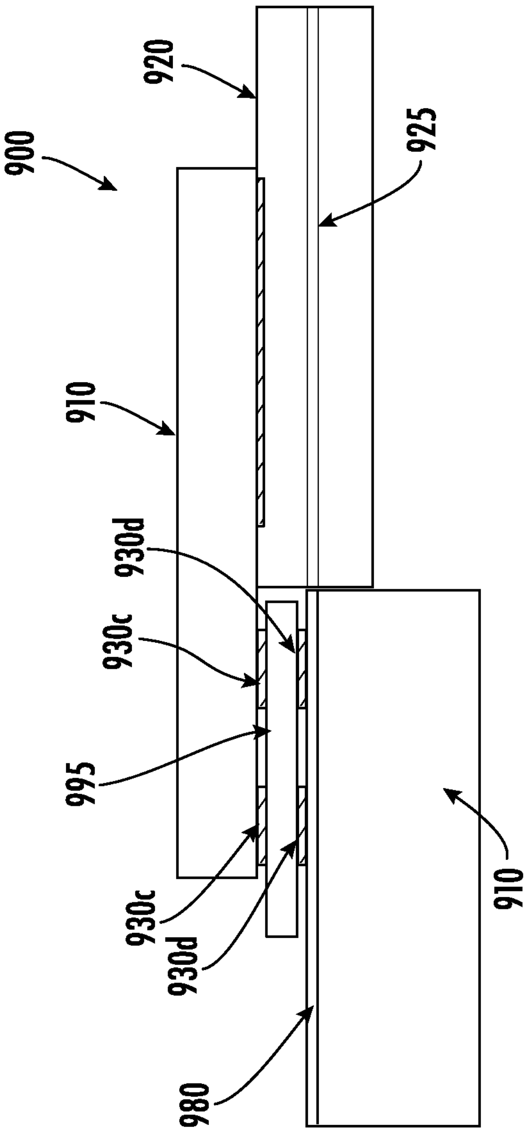

In addition to or in the alternative of a thick layer of nano-particles, a spacer substrate with precision thickness may be used. For example, as illustrated in FIG. 13F, a spacer substrate 995 may be used in addition to two thin layers of nano-particles 930*d*. A precision thickness glass spacer substrate 995 may be selected to displace the base substrate 910 from the PLC substrate 960, such that the core 925 of the optical fiber aligns with the planar waveguide 980 of the PLC substrate 960. In some embodiments, the spacer substrate 995 may be attached to the base substrate 910 with a thin layer of nano-particles 930*c*, and attached to the PLC substrate 960 with another thin layer of nano-particles 930*d*. Both of the thin layers of nano-particles are heated, for example, with laser heating, to encourage partial sintering of the nano-particles to join the FAU 900 and the PLC substrate 960, as illustrated in FIG. 13G.

In some embodiments, the precision thickness spacer 995 may be formed using a glass fusion process, a precision redraw process, or a similar process for glass substrates. In some embodiments, the spacer substrate 995 may be pre-attached to the PLC substrate 960 with a layer of partially sintered nano-particles 930. The joining interface may survive solder reflow conditions, without distortion or creep. In this case, the final nano-particle layer may be sintered, for example, via laser heating, from the top side.

In some embodiments, the spacer substrate 995 may be a fiber array raft, or other similar appropriate passive alignment mechanisms.

Although, as described herein, partially sintered nano-particle layers are used to join photonic components, other applications which join materials which nano-particles may bond to, including glass, ceramics, metals, and polymers, alone or in combination, are contemplated. For example, joining of optical lenses and support components, joining of dielectric filters to glass support substrates in micro-optic WDM (Wavelength Division Multiplexing) assemblies, joining glass FAUs to PLC's where nano-particle materials are applied to one or both interfacing surfaces, and assembly of optical components that require arbitrary displacement and rotation, are contemplated.

Although the above examples describe use of a layer of nano-particles, as is consistent with description herein, such examples may utilize the various different forms of a layer of nano-particles (e.g., with filler material, where the layer of nano-particles is applied to filler material, etc.).

Example Systems

Figure 14:
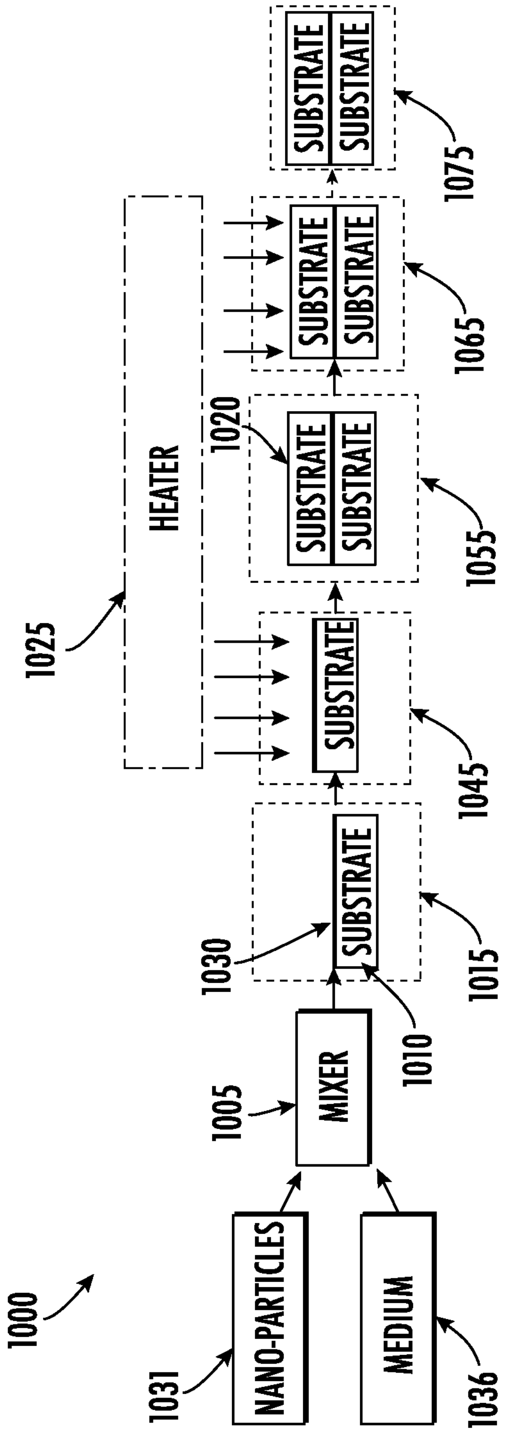
FIG. 14 illustrates an example system for joining photonic components, in accordance with some embodiments discussed herein.

Joining of substrates using nano-particles, as discussed above, may be accomplished through a joining system. FIG. 14 shows an example system 1000 for joining substrates. The nano-particles 1031 may be suspended in a medium 1036, such as by a mixer 1005. In some embodiments, a filler material may also be introduce to the mixer 1005. The mixture 1030 of nano-particle suspended in the medium is then applied to a first substrate 1010 via, for example, an applicator 1015. In some embodiments, the mixture 1030 may first be applied as a coating onto a plurality of filler particles. In such embodiments, the applicator 1015 then applies a layer of the coated filler particles to the first substrate.

The mixture on the first substrate 1010 is then exposed to a thermal process, such as by a heater 1025. In some embodiments, the thermal process may include use of an over or a laser, although other thermal processes are contemplated. The thermal process may remove at least a portion of the medium, yielding a layer of nano-particles in contact with other nano-particles and in contact with the first substrate 1010.

A second substrate 1020 is aligned, and placed on the layer of nano-particles, such as with an alignment mechanism 1055. In some embodiments, the alignment mechanism 1055 may be within the same component as the applicator 1015, and in other embodiments, the alignment mechanism 1055 and the applicator 1015 may be separate. At 1065, the heater 1025 (e.g., the same heater or a separate heater) may apply heat to the substrates and nano-particle assembly, such as at no more than 300° C. so that the nano-particles fuse at the contact points of adjacent nano-particle to cause secure alignment of the assembly—shown at 1075. In some embodiments, the heater 1025 may be two heaters, such that a first heater applies a thermal process, and the second heater applies a second thermal process, wherein the thermal process may be the same or different. The thermal processes may be oven heating, RF heating, IR heating, Laser heating, or other suitable types of heating.

In some embodiments, the system may include additional assemblies wherein a third and/or fourth substrate may be included in the system.

Example Flowchart(s)

Figure 15:
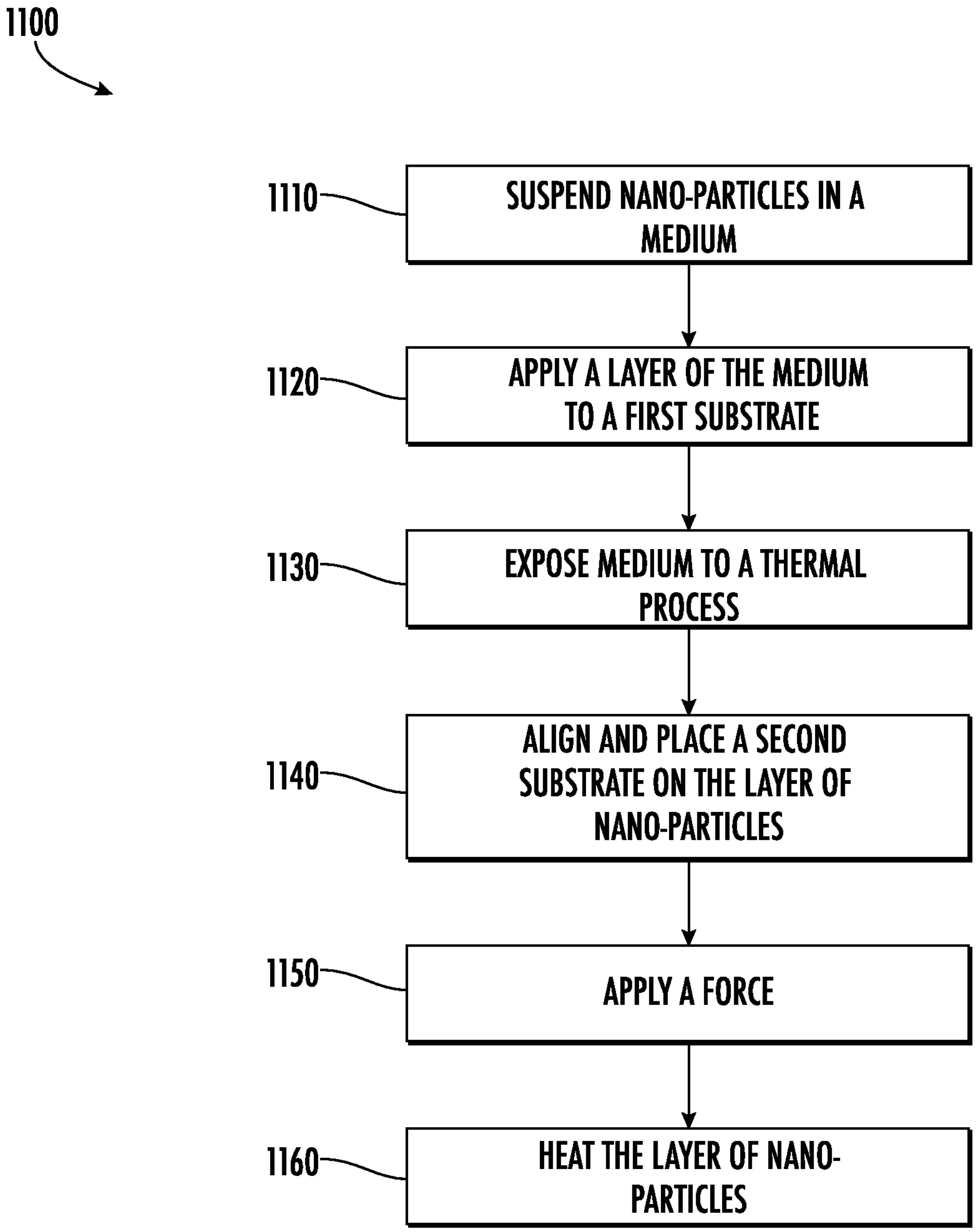
FIG. 15 illustrates a flowchart of an example method for joining two substrates using nano-particles, in accordance with some embodiments discussed herein.

FIG. 15 is a flow chart illustrating an example method 1100 for nano-particle joining of photonic components, in accordance with some embodiments discussed herein. At operation 1110, nano-particles are suspended in a medium. At operation 1120, a layer of the nano-particle medium is applied to a first substrate. At operation 1130, the medium is exposed to a thermal process. The thermal process is designed to remove at least a portion of the medium to expose the nano-particles, such that the nano-particles have contact points with adjacent nano-particles and the first substrate. At operation 1140, a second substrate may be aligned and applied onto the layer of nano-particles on the first substrate. At operation 1150, a force may be applied to the second substrate such that the layer of nano-particles is in contact with both the first substrate and the second substrate. At operation 1160, the layer of nano-particles is heated such as to cause connection of the contact points of adjacent nano-particles to cause secure alignment of the first substrate and the second substrate. In some embodiments, operations 1140, 1150, and/or 1160 may applied simultaneously or near simultaneously.

CONCLUSION

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

That which is claimed:

1. A method for joining photonic components, the method comprising:

suspending nano-particles in a medium, wherein the nano-particles include metal nano-particles;

applying a layer of the medium with the suspended nano-particles to a first substrate;

exposing the layer of the medium to a thermal process to remove at least a portion of the medium and expose the nano-particles;

placing a second substrate on the nano-particles in alignment with the first substrate; and causing application of heat to the nano-particles to cause connection of contact points between adjacent nano-particles to secure alignment of the first substrate and the second substrate, wherein the heat applied to the nano-particles is less than 300° C., and wherein the heat is applied until particle necking occurs and is ceased before material coalescence occurs.

2. The method of claim 1, wherein at least one of the first substrate and the second substrate is one of a glass substrate, a silicon substrate, or a ceramic substrate.

3. The method of claim 1, wherein at least one of the first substrate and the second substrate is one of a precision flat fusion glass or a precision V-groove substrate.

4. The method of claim 1, wherein the heat applied to the nano-particles is less than 250° C.

5. The method of claim 1, wherein the heat applied to the nano-particles is for less than 2 seconds.

6. The method of claim 1, wherein the heat is applied to the nano-particles until partial sintering occurs.

7. The method of claim 1, wherein the causing application of heat to the nano-particles causes contact points between adjacent nano-particles to engage in particle necking.

8. The method of claim 1, wherein the thermal process is one of oven heating, laser heating, microwave heating, RF heating, infrared heating, visible light heating, ultraviolet heating, or Joule heating.

9. The method of claim 1, wherein the nano-particles comprise at least one of nano-copper, nano-silver, or nano-gold.

10. The method of claim 1, wherein the application of heat to the nano-particles is via either oven heating, laser heating, microwave heating, RF heating, infrared heating, visible light heating, ultraviolet heating, or Joule heating.

11. The method claim 1, wherein the medium comprises a solvent-based slurry, a paste, an ink, or a liquid solvent.

12. The method of claim 1, wherein the layer of the medium with the suspended nano-particles is applied to the first substrate by screen printing, three-dimensional printing, transfer printing, aerosol spraying, or doctor blade application.

13. The method of claim 1, wherein the medium comprises one or more filler particles that each have a maximum height smaller than a desired gap thickness between the first substrate and the second substrate, wherein the one or more filler particles can each be a nano-particle or other material formed with a specific diameter.

14. The method of claim 1, wherein the heated nano-particles form partially sintered nano-particles, and wherein the method further comprises:

disposing an adhesive about the partially sintered nano-particles between the first substrate and the second substrate.

15. The method of claim 1, further comprising:

aligning the second substrate relative to the first substrate with a third substrate.

16. The method of claim 1, further comprising:

applying a second layer of the medium with the suspended nano-particles to a third substrate;

exposing the second layer of the medium to a second thermal process to remove at least a portion of the medium and expose second nano-particles from the second layer of the medium;

placing the third substrate on the second substrate; and causing application of heat to the second nano-particles to cause connection of contact points between adjacent second nano-particles to secure alignment of the second substrate and the third substrate, wherein the heat applied to the second nano-particles is less than 300° C.

17. The method of claim 16, further comprising:

applying a third layer of the medium with the suspended nano-particles to a fourth substrate;

exposing the third layer of the medium to a third thermal process to remove at least a portion of the medium and expose third nano-particles from the third layer of the nano-particle medium; and placing the fourth substrate between the first substrate and the third substrate such that a core of the second substrate and a planar waveguide of the third substrate are aligned.

18. The method of claim 1, wherein the layer of nano-particles is discontinuous, and wherein placing the second substrate on the layer of discontinuous nano-particles comprises:

aligning a first ion exchange waveguide of the first substrate with a second ion exchange waveguide of the second substrate such that the layer of nano-particles is discontinuous where the first ion exchange waveguide and the second ion exchange waveguide are aligned.

19. A method for joining photonic components, the method comprising:

suspending nano-particles in a medium, wherein the nano-particles include metal nano-particles;

applying a layer of the medium with the suspended nano-particles to a first substrate;

exposing the layer of the medium to a thermal process to remove at least a portion of the medium and expose the nano-particles;

placing a second substrate on the nano-particles in alignment with the first substrate;

causing application of heat to the nano-particles to cause connection of contact points between adjacent nano-particles to secure alignment of the first substrate and the second substrate, wherein the heat applied to the nano-particles is less than 300° C.;

applying a second layer of the medium with the suspended nano-particles to a third substrate;

exposing the second layer of the medium to a second thermal process to remove at least a portion of the medium and expose second nano-particles from the second layer of the medium;

placing the third substrate on the second substrate; and causing application of heat to the second nano-particles to cause connection of contact points between adjacent second nano-particles to secure alignment of the second substrate and the third substrate, wherein the heat applied to the second nano-particles is less than 300° C.

20. A method for joining photonic components, the method comprising:

suspending nano-particles in a medium, wherein the nano-particles include metal nano-particles;

applying a layer of the medium with the suspended nano-particles to a first substrate;

exposing the layer of the medium to a thermal process to remove at least a portion of the medium and expose the nano-particles;

placing a second substrate on the nano-particles in alignment with the first substrate;

causing application of heat to the nano-particles to cause connection of contact points between adjacent nano-particles to secure alignment of the first substrate and the second substrate, wherein the heat applied to the nano-particles is less than 300° C.;

applying a second layer of the medium with the suspended nano-particles to a third substrate;

exposing the second layer of the medium to a second thermal process to remove at least a portion of the medium and expose second nano-particles from the second layer of the medium;

placing the third substrate on the second substrate;

causing application of heat to the second nano-particles to cause connection of contact points between adjacent second nano-particles to secure alignment of the second substrate and the third substrate, wherein the heat applied to the second nano-particles is less than 300° C.;

applying a third layer of the medium with the suspended nano-particles to a fourth substrate;

exposing the third layer of the medium to a third thermal process to remove at least a portion of the medium and expose third nano-particles from the third layer of the nano-particle medium; and placing the fourth substrate between the first substrate and the third substrate such that a core of the second substrate and a planar waveguide of the third substrate are aligned.

* * * * *